US012738777B2

(12) United States Patent
Hirayama et al.

(10) Patent No.: US 12,738,777 B2
(45) Date of Patent: Sep. 15, 2026

(54) ADHESIVE BONDING STRUCTURE IN STACKED CORE AND ROTATING ELECTRICAL MACHINE

(71) Applicant: NIPPON STEEL CORPORATION, Tokyo (JP)

(72) Inventors: Ryu Hirayama, Tokyo (JP); Kazutoshi Takeda, Tokyo (JP); Takeaki Wakisaka, Tokyo (JP); Shuichi Yamazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 234 days.

(21) Appl. No.: 18/691,774

(22) PCT Filed: Oct. 19, 2022

(86) PCT No.: PCT/JP2022/038923
§ 371 (c)(1),
(2) Date: Mar. 13, 2024

(87) PCT Pub. No.: WO2023/095496
PCT Pub. Date: Jun. 1, 2023

(65) Prior Publication Data

US 2025/0132614 A1 Apr. 24, 2025

(30) Foreign Application Priority Data

Nov. 25, 2021 (JP) ................................ 2021-191446

(51) Int. Cl.
*H02K 1/12* (2006.01)
*H02K 1/02* (2006.01)

(52) U.S. Cl.
CPC ................ *H02K 1/12* (2013.01); *H02K 1/02* (2013.01); *H02K 2201/09* (2013.01)

(58) Field of Classification Search
CPC ........ H02K 1/12; H02K 1/02; H02K 2201/09; H02K 1/146; H02K 15/021;
(Continued)

(56) References Cited

U.S. PATENT DOCUMENTS

2018/0056629 A1* 3/2018 Hamamura ........... H02K 1/185

FOREIGN PATENT DOCUMENTS

JP 2008-78346 A 4/2008
WO WO-2020129937 A1 * 6/2020 .............. H02K 1/06

OTHER PUBLICATIONS

WO2020129937A1 English translation (Year: 2025).*

* cited by examiner

*Primary Examiner* — Christopher M Koehler
*Assistant Examiner* — Viswanathan Subramanian
(74) *Attorney, Agent, or Firm* — Birch, Stewart, Kolasch & Birch, LLP

(57) ABSTRACT

An electrical steel sheet includes an annular body. At least one of a plurality of adhesion layers (41) is a first adhesion layer. In one of two electrical steel sheets sandwiching the first adhesion layer in a stacking direction, when an imaginary axis intersecting with a central axis of the annular body and extending in an easy-magnetization direction is defined as an L-axis, an imaginary axis intersecting with the central axis and intersecting with the L-axis is defined as a C-axis, and the electrical steel sheet is partitioned into a plurality of sections (S) in a circumferential direction of the annular body by the L-axis and the C-axis, at least one of the plurality of sections (S) is a first section. In the first section, an area of the first adhesion layer in a first portion (P1) of the electrical steel sheet where a main magnetic flux is generated in the L-axis direction is smaller than an area of the first adhesion layer in a second portion (P2) of the electrical steel (Continued)

sheet where the main magnetic flux is generated in the C-axis direction.

15 Claims, 13 Drawing Sheets

(58) Field of Classification Search
CPC .. H02K 2213/03; H02K 1/185; H02K 11/014; H02K 15/022; H02K 21/16; B32B 37/12
USPC .......................................................... 310/216
See application file for complete search history.

ADHESIVE BONDING STRUCTURE IN STACKED CORE AND ROTATING ELECTRICAL MACHINE

TECHNICAL FIELD OF THE INVENTION

The present disclosure relates to a stacked core and a rotating electrical machine.

The present application claims priority based on Japanese Patent Application No. 2021-191446 filed in Japan on Nov. 25, 2021, the contents of which are incorporated herein by reference.

RELATED ART

A rotation speed of a main machine (a rotating electrical machine, an electric motor, or a motor) for EV/HEV, of which the number of use is expected to increase in the future, is becoming higher for the purpose of reducing the size and weight. As the rotation speed increases, iron loss of a rotor core or a stator core increases, leading to efficiency reduction. A main factor of an increase in iron loss due to high frequency excitation is an increase in eddy-current loss, and a measure for improvement thereof is thinning of an electrical steel sheet.

On the other hand, when a rotor core or a stator core formed by punching or the like is stacked, crimping is generally used, but it is very difficult to stack and fix ultrathin electrical steel sheets by crimping. At this time, bonding and fixing is one of methods for stacking and fixing ultrathin electrical steel sheets (See, for example, Patent Document 1 below.).

CITATION LIST

Patent Document

Patent Document 1

Japanese Unexamined Patent Application, First Publication No. 2008-78346

SUMMARY OF INVENTION

Problems to be Solved by the Invention

However, in the conventional bonding and fixing method, when an electrical steel sheet is fixed using an adhesive, an elastic compressive stress generated in the electrical steel sheet due to solidification shrinkage of the adhesive may deteriorate magnetic characteristics (excitation characteristics and iron loss characteristics), leading to an increase in loss. Note that such a problem occurs not only in an electric motor but also in an entire rotating electrical machine including a generator.

The present disclosure has been made in view of the above-described circumstances, and an object of the present disclosure is to propose a stacked core capable of suppressing an increase in loss (iron loss and copper loss) while maintaining a holding force for stacking and fixing.

Means for Solving the Problem

<1> A stacked core according to an aspect of the present disclosure includes: a plurality of stacked electrical steel sheets; and a plurality of adhesion layers disposed between the electrical steel sheets adjacent to each other in a stacking direction, in which the electrical steel sheet includes an annular body, at least one adhesion layer of the plurality of adhesion layers is a first adhesion layer, in one electrical steel sheet of the two electrical steel sheets sandwiching the first adhesion layer in the stacking direction, when an imaginary axis intersecting with a central axis of the annular body and extending in an easy-magnetization direction is defined as an L-axis, an imaginary axis intersecting with the central axis and intersecting with the L-axis is defined as a C-axis, and the electrical steel sheet is partitioned into a plurality of sections in a circumferential direction of the annular body by the L-axis and the C-axis, at least one section of the plurality of sections is a first section, and in the first section, the area of the first adhesion layer in a first portion of the electrical steel sheet where a main magnetic flux is generated in the L-axis direction is smaller than the area of the first adhesion layer in a second portion of the electrical steel sheet where a main magnetic flux is generated in the C-axis direction.

As a result of intensive studies, the inventor of the present application has obtained the following findings. That is, in a stacked core in which electrical steel sheets adjacent to each other in a stacking direction are bonded and fixed to each other by an adhesive, a compressive stress is applied to the electrical steel sheets due to the adhesive, and this compressive stress affects deterioration (the amount of an increase in iron loss or the like) of magnetic characteristics of the electrical steel sheets. The inventor of the present application has newly found that the degree of this influence varies depending on a direction of a main magnetic flux generated in the electrical steel sheets. More specifically, in a case where the direction of the main magnetic flux is an L direction (easy-magnetization direction), as compared with a case where the direction of the main magnetic flux is a C direction (a direction intersecting with the L direction, a direction that is not an easy magnetization direction), the higher an adhesive area ratio in the electrical steel sheet, the larger an iron loss deterioration ratio, and the higher a compressive stress applied per unit area of the electrical steel sheet, the larger the iron loss deterioration ratio (See, for example, FIGS. 13, 14, and 16 described later.). Note that the main magnetic flux is a generic term for magnetic fluxes generated in a rotor core or a stator core.

Based on the above findings, the inventor of the present application has reached that, in a stacked core including an annular body, an electrical steel sheet is partitioned into a plurality of sections by an L-axis and a C-axis, and in at least one of the plurality of sections, the area of an adhesion layer is made different depending on a direction in which the main magnetic flux is generated. That is, the inventor of the present application has reached that in the first section that is at least one of the plurality of sections, the area of the first adhesion layer in a first portion where the main magnetic flux is generated in the L direction is made smaller than the area of the first adhesion layer in a second portion where the main magnetic flux is generated in the C direction. As a result, instead of forming a large adhesion layer in a portion having a large influence on iron loss in the electrical steel sheet, the large adhesion layer can be formed in a portion having a small influence on iron loss. Therefore, it is possible to suppress an increase in loss while ensuring a required holding force.

<2> In the stacked core according to <1>, in the first section, when a region relatively close to the C-axis is referred to as a C-axis side region and a region relatively close to the L-axis is referred to as an L-axis side region, the first portion may include a portion located in the C-axis side region of the annular body, and the second portion may include a portion located in the L-axis side region of the annular body.

In the stacked core including the annular body, the main magnetic flux is generated mainly in a circumferential direction in the annular body. A relative relationship between the main magnetic flux generated in the annular body and the L direction or the C direction differs depending on a position where the main magnetic flux is generated in the circumferential direction. For example, in a portion of the annular body located on an L-axis side, the number of components of the main magnetic flux in the C direction increases. On the other hand, in a portion of the annular body located on a C-axis side, the number of components of the main magnetic flux in the L direction increases.

<3> In the stacked core according to <2>, the first adhesion layer may include a first adhesive portion disposed on at least one of an inner peripheral edge and an outer peripheral edge of the annular body, and in the first section, the area of the first adhesive portion in the C-axis side region may be smaller than the area of the first adhesive portion in the L-axis side region.

The first adhesive portion is disposed on at least one of the inner peripheral edge and the outer peripheral edge of the annular body and extends mainly in a circumferential direction. Therefore, the first adhesive portion extends, in the C-axis side region, in a direction closer to the L direction than the C direction (having a gentle inclination), and extends, in the L-axis side region, in a direction closer to the C direction than the L direction (having a gentle inclination). Therefore, as for the first adhesive portion, as the number of portions disposed in the L-axis side region increases, a ratio of the first adhesive portion extending in the direction close to the C direction increases, and an influence on iron loss decreases.

Therefore, in the stacked core, in the first section, the area of the first adhesive portion in the C-axis side region is smaller than the area of the first adhesive portion in the L-axis side region. Therefore, an influence of the first adhesive portion on iron loss can be suppressed to be small.

<4> In the stacked core according to <3>, the first adhesive portion may extend in a belt shape along at least one of an inner peripheral edge and an outer peripheral edge of the annular body, and in the first section, the width of the first adhesive portion may be equal regardless of a position in the circumferential direction, or may decrease from the L-axis toward the C-axis along the circumferential direction.

<5> In the stacked core according to <4>, in the first section, the width of the first adhesive portion may decrease from the L-axis toward the C-axis along the circumferential direction.

In the first section, the width of the first adhesive portion is equal regardless of a position in the circumferential direction, or decreases from the L-axis toward the C-axis along the circumferential direction. Note that the width of the first adhesive portion preferably decreases from the L-axis toward the C-axis along the circumferential direction. The above-described effects are remarkably exhibited by the above.

<6> In the stacked core according to any one of <1> to <5>, the electrical steel sheet may further include a plurality of teeth protruding from the annular body inward in a radial direction of the annular body and disposed at intervals in a circumferential direction of the annular body, the first portion may include a portion of the teeth located in the L-axis side region, and the second portion may include a portion of the teeth located in the C-axis side region.

Note that, as described above, when the electrical steel sheet includes not only the annular body but also the teeth, the first adhesion layer bonds not only the annular bodies but also the teeth of the electrical steel sheet, the first section is defined not only for the annular body but also for the teeth, and each of the first portion and the second portion includes not only a part or the whole of the annular body but also a part or the whole of the teeth.

In the stacked core including the teeth, the main magnetic flux is generated mainly in a radial direction in the teeth. A relative relationship between the main magnetic flux generated in the teeth and the L direction or the C direction differs depending on a position where the main magnetic flux is generated in a circumferential direction of the teeth. For example, the number of components of the main magnetic flux in the L direction increases in teeth located on the L-axis side among the plurality of teeth. On the other hand, the number of components of the main magnetic flux in the C direction increases in teeth located on the C-axis side among the plurality of teeth.

<7> In the stacked core according to <6>, the first adhesion layer may include a second adhesive portion disposed on a peripheral edge of the teeth, and in the first section, the area of the second adhesive portion in the C-axis side region may be larger than the area of the second adhesive portion in the L-axis side region.

The second adhesive portion is disposed on a peripheral edge of the teeth and extends mainly in a radial direction. Therefore, the second adhesive portion extends, in the C-axis side region, in a direction closer to the C direction than the L direction (having a gentle inclination), and extends, in the L-axis side region, in a direction closer to the L direction than the C direction (having a gentle inclination). Therefore, as for the second adhesive portion, as the number of portions disposed in the C-axis side region increases, a ratio of the second adhesive portion extending in the direction close to the C direction increases, and an influence on iron loss decreases.

Therefore, in the stacked core, in the first section, the area of the second adhesive portion in the C-axis side region is larger than the area of the second adhesive portion in the L-axis side region. Therefore, an influence of the second adhesive portion on iron loss can be suppressed to be small.

<8> In the stacked core according to <7>, the second adhesive portion may extend in a belt shape along a peripheral edge of the teeth, and in the first section, the width of the second adhesive portion may be equal regardless of positions of the teeth in the circumferential direction, or may be larger for the teeth located closer to the C-axis side than for the teeth located closer to the L-axis side along the circumferential direction.

<9> In the stacked core according to <8>, in the first section, the width of the second adhesive portion may be larger for the teeth located closer to the C-axis side than for the teeth located closer to the L-axis side along the circumferential direction.

In the first section, the width of the second adhesive portion is equal regardless of the positions of the teeth in the circumferential direction, or is larger for the teeth located closer to the C-axis side than for the teeth located closer to the L-axis side along the circumferential direction. Note that, in the first section, the width of the second adhesive portion is preferably larger for the teeth located closer to the C-axis side than for the teeth located closer to the L-axis side along the circumferential direction. The above-described effects are remarkably exhibited by the above.

<10> In the stacked core according to any one of <2> to <5>, in the first section, when an imaginary axis extending in a direction dividing a central angle formed by the C-axis and the L-axis around the central axis into two equal parts is defined as a reference axis, the C-axis side region and the L-axis side region may have a symmetrical relationship in the circumferential direction with respect to the reference axis.

The C-axis side region and the L-axis side region are symmetric in the circumferential direction with respect to the reference axis. Therefore, the above-described effects are remarkably exhibited.

<11> In the stacked core according to any one of <2> to <10>, the first adhesion layer may include a belt-shaped adhesive portion, in the L-axis side region, the total area of the belt-shaped adhesive portions in which the circumferential direction is a longitudinal direction may be larger than the total area of the belt-shaped adhesive portions in which a radial direction of the annular body is a longitudinal direction, and in the C-axis side region, the total area of the belt-shaped adhesive portions in which the circumferential direction is a longitudinal direction may be smaller than the total area of the belt-shaped adhesive portions in which the radial direction is a longitudinal direction.

<13> In the stacked core according to any one of <1> to <11>, all of the plurality of adhesion layers may be the first adhesion layers.

In a case where all of the plurality of adhesion layers are the first adhesion layers including the first section, in other words, in a case where a condition that all of the plurality of adhesion layers are the first adhesion layers is satisfied, the above-described effects are remarkably exhibited, for example, as compared with a case where some of the plurality of adhesion layers do not satisfy the condition that the adhesion layers are the first adhesion layers.

<14> In the stacked core according to any one of <1> to <12>, all of the plurality of sections may be the first sections.

In a case where all of the plurality of sections in the first adhesion layer are the first sections, in other words, in a case where a condition that all of the plurality of sections are the first sections is satisfied, the above-described effects are remarkably exhibited, for example, as compared with a case where some of the plurality of sections do not satisfy the condition that the sections are the first sections.

<14> In the stacked core according to any one of <1> to <13>, the electrical steel sheet may be a non-oriented electrical steel sheet.

<15> In the stacked core according to any one of <1> to <13>, the electrical steel sheet may be a grain-oriented electrical steel sheet.

<16> In the stacked core according to any one of <1> to <15>, the only one easy-magnetization direction may exist in the one electrical steel sheet, and the L-axis and the C-axis may be orthogonal to each other.

<17> In the stacked core according to any one of <1> to <15>, the two or more easy-magnetization directions may exist in the one electrical steel sheet, the L-axis may each extend in the two or more easy-magnetization directions to intersect with each other on the central axis, and the C-axis may extend in a direction in which a central angle formed around the central axis by the L-axes adjacent to each other in the circumferential direction is divided into two equal parts.

<18> A rotating electrical machine according to an aspect of the present disclosure includes the stacked core according to any one of <1> to <17>.

Effects of the Invention

According to the present disclosure, it is possible to suppress an increase in loss while maintaining a holding force for stacking and fixing.

EMBODIMENT OF THE INVENTION

Hereinafter, a rotating electrical machine according to an embodiment of the present disclosure will be described with reference to the drawings. Note that in the present embodiment, an electric motor, specifically, an AC electric motor, more specifically, a synchronous electric motor, and still more specifically, a permanent magnet field type electric motor will be described as an example of the rotating electrical machine. This type of electric motor is suitably adopted in, for example, an electric vehicle.

Figure 1:
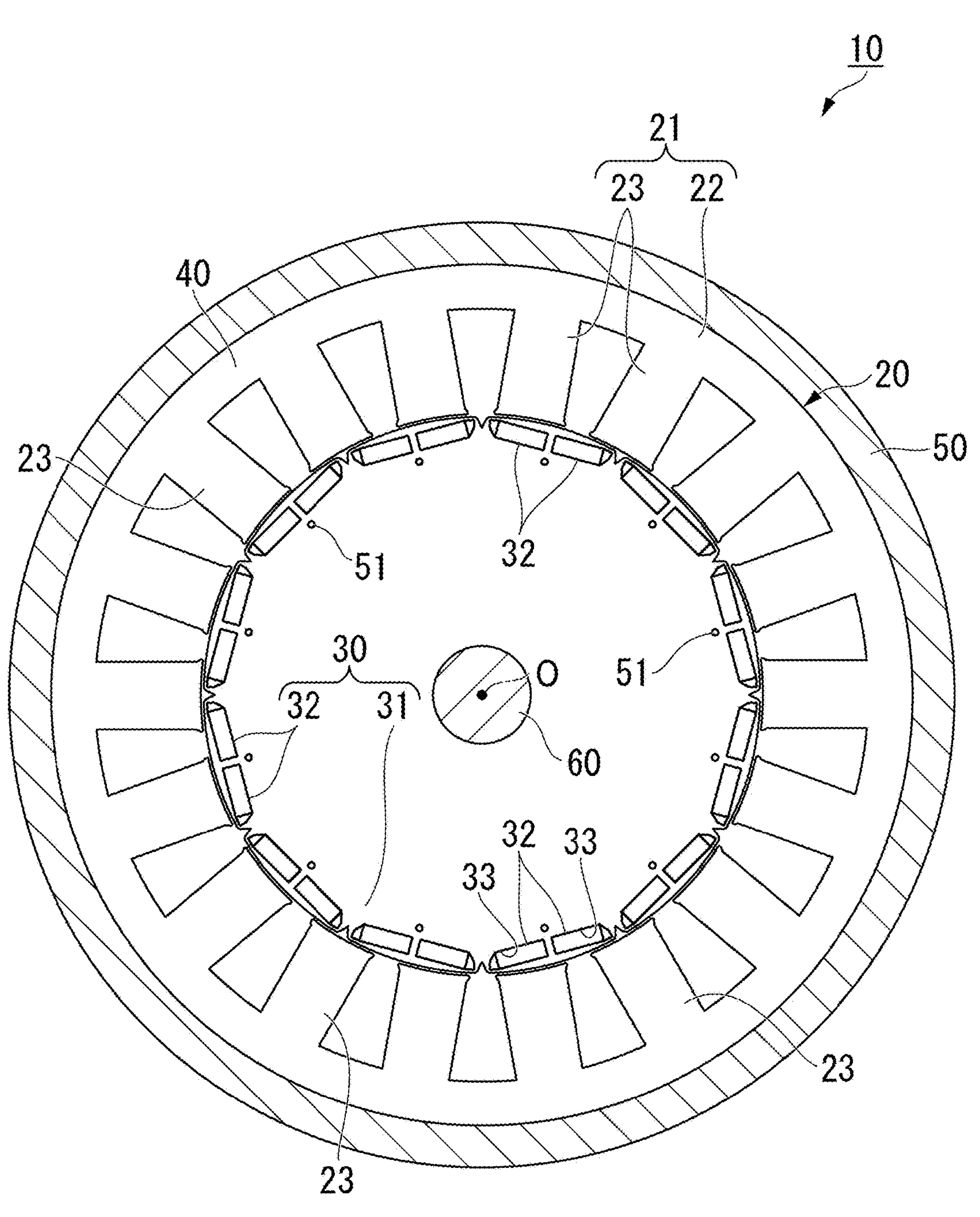
FIG. 1 is a cross-sectional view of a rotating electrical machine according to an embodiment of the present disclosure.
Figure 2:
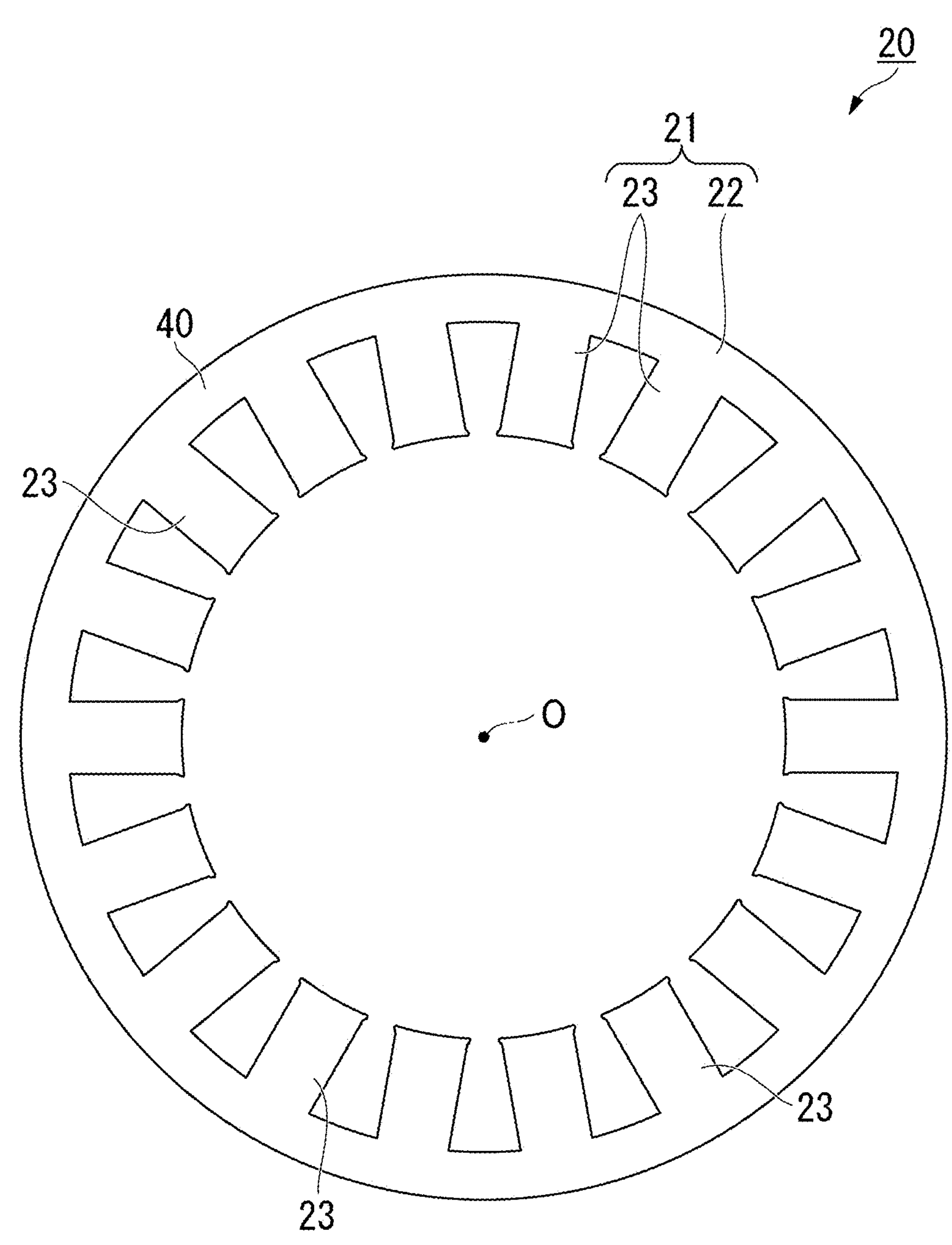
FIG. 2 is a plan view of a stator included in the rotating electrical machine illustrated in FIG. 1.

As illustrated in FIGS. 1 and 2, the rotating electrical machine 10 includes a stator 20, a rotor 30, a case 50, and a rotating shaft 60. The stator 20 and the rotor 30 are housed in the case 50. The stator 20 is fixed to the case 50.

In the present embodiment, an inner rotor type machine in which the rotor 30 is located inside the stator 20 is adopted as the rotating electrical machine 10. However, an outer rotor type machine in which the rotor 30 is located outside the stator 20 may be adopted as the rotating electrical machine 10. In the present embodiment, the rotating electrical machine 10 is a three-phase AC motor having 12 poles and 18 slots. However, for example, the number of poles, the number of slots, the number of phases, and the like can be appropriately changed. Note that, for example, the rotating electrical machine 10 can rotate at a rotation speed of 1000 rpm by applying an excitation current having an effective value of 10 A and a frequency of 100 Hz to each phase.

The stator 20 includes a stator core 21 and a winding (not illustrated).

The stator core 21 includes a cylindrical core back 22 (annular body) and a plurality of teeth 23. Hereinafter, an axis direction (central axis O direction of the stator core 21) of the stator core 21 (core back 22) is simply referred to as an axial direction, a radial direction (direction orthogonal to the central axis O of the stator core 21) of the stator core 21 (core back 22) is simply referred to as a radial direction, and a circumferential direction (direction going around the central axis O of the stator core 21) of the stator core 21 (core back 22) is simply referred to as a circumferential direction.

The core back 22 has an annular shape in plan view when the stator 20 is viewed from the axial direction.

The plurality of teeth 23 protrude inward in a radial direction from the core back 22 (toward the central axis O of the core back 22 along the radial direction). The plurality of teeth 23 are disposed at equal intervals in the circumferential direction. In the present embodiment, 18 teeth 23 are arranged every 20 degrees of a central angle centered on the central axis O. The plurality of teeth 23 have an equal shape and an equal size.

The winding is wound around the teeth 23. The winding may be wound by concentrated winding or distributed winding.

The rotor 30 is disposed inside the stator 20 (stator core 21) in the radial direction. The rotor 30 includes a rotor core 31 and a plurality of permanent magnets 32.

The rotor core 31 is disposed coaxially with the stator 20 and has a cylindrical shape. The rotating shaft 60 is disposed in the rotor core 31. The rotating shaft 60 is fixed to the rotor core 31 so as to rotate together with the rotor core 31.

The plurality of permanent magnets 32 is fixed to the rotor core 31. In the present embodiment, a pair of permanent magnets 32 functions as one magnetic pole. The plurality of pairs of permanent magnets 32 are disposed at equal angular intervals in the circumferential direction. In the present embodiment, 12 pairs of (24 in total) permanent magnets 32 are arranged every 30 degrees of a central angle centered on the central axis O.

In the present embodiment, an embedded magnet type motor is adopted as the permanent magnet field type electric motor. A plurality of through-holes 33 penetrating the rotor core 31 in the axial direction is formed in the rotor core 31. The plurality of through-holes 33 are formed corresponding to the plurality of permanent magnets 32. Each of the permanent magnets 32 is fixed to the rotor core 31 in a state of being disposed in the corresponding through-hole 33. Each of the permanent magnets 32 can be fixed to the rotor core 31, for example, by bonding an outer surface of the permanent magnet 32 to an inner surface of the through-hole 33 with an adhesive. Note that, as the permanent magnet field type electric motor, a surface magnet type motor may be adopted instead of the embedded magnet type motor.

The stator core 21 and the rotor core 31 are both stacked cores. The stacked core is formed by stacking a plurality of electrical steel sheets 40.

Note that each of the stator core 21 and the rotor core 31 has a stacking thickness of, for example, 50.0 mm. The stator core 21 has an outer diameter of, for example, 250.0 mm. The stator core 21 has an inner diameter of, for example, 165.0 mm. The rotor core 31 has an outer diameter of, for example, 163.0 mm. The rotor core 31 has an inner diameter of, for example, 30.0 mm. Note that these values are merely examples, and the stacking thickness, the outer diameter, and the inner diameter of the stator core 21, and the stacking thickness, the outer diameter, and the inner diameter of the rotor core 31 are not limited to these values. Here, the inner diameter of the stator core 21 is based on end portions of the teeth 23 in the stator core 21. The inner diameter of the stator core 21 is the diameter of an imaginary circle inscribed in the end portions of all the teeth 23.

Each of the electrical steel sheets 40 forming the stator core 21 and the rotor core 31 is formed by, for example, punching an electrical steel sheet serving as a base metal. As the electrical steel sheet 40, a known electrical steel sheet can be used. A chemical composition of the electrical steel sheet 40 is not particularly limited. In the present embodiment, a non-oriented electrical steel sheet is adopted as the electrical steel sheet 40. As the non-oriented electrical steel sheet, a non-oriented electrical steel strip of JISC2552: 2014 can be adopted. However, as the electrical steel sheet 40, a grain-oriented electrical steel sheet can be adopted instead of the non-oriented electrical steel sheet. As the grain-oriented electrical steel sheet, an oriented electrical steel strip of JIS C 2553:2012 can be adopted. Furthermore, as the electrical steel sheet 40, an Fe-based amorphous alloy can be adopted instead of the non-oriented electrical steel sheet. As the Fe-based amorphous alloy, for example, an iron-based amorphous strip of JIS C 2534:2017 can also be adopted.

Insulating coatings are formed on both surfaces of the electrical steel sheet 40 in order to improve workability of the electrical steel sheet and iron loss of the stacked core. As a substance constituting the insulating coating, for example, (1) an inorganic compound, (2) an organic resin, and (3) a mixture of an inorganic compound and an organic resin can be applied. Examples of the inorganic compound include (1) a complex of a dichromate and boric acid, and (2) a complex of a phosphate and silica. Examples of the organic resin include an epoxy-based resin, an acrylic resin, an acrylic styrene-based resin, a polyester-based resin, a silicon-based resin, and a fluorine-based resin.

In order to ensure insulation performance between the electrical steel sheets 40 stacked on each other, the thickness of the insulating coating (thickness of one surface of the electrical steel sheet 40) is preferably 0.1 μm or more.

On the other hand, as the insulating coating becomes thicker, an insulating effect is saturated. In addition, as the insulating coating becomes thicker, a space factor decreases, and performance as the stacked core decreases. Therefore, the insulating coating is preferably thin within a range in which insulation performance can be ensured. The thickness of the insulating coating (thickness of one surface of the electrical steel sheet 40) is preferably 0.1 μm or more and 5 μm or less, and more preferably 0.1 μm or more and 2 μm or less.

As the electrical steel sheet 40 becomes thinner, an effect of improving iron loss is gradually saturated. In addition, as the electrical steel sheet 40 becomes thinner, manufacturing cost of the electrical steel sheet 40 increases. Therefore, the thickness of the electrical steel sheet 40 is preferably 0.10 mm or more in consideration of the effect of improving iron loss and the manufacturing cost.

On the other hand, when the electrical steel sheet 40 is too thick, press punching operation of the electrical steel sheet 40 is difficult. Therefore, the thickness of the electrical steel sheet 40 is preferably 0.65 mm or less in consideration of the press punching operation of the electrical steel sheet 40.

In addition, as the electrical steel sheet 40 becomes thicker, iron loss increases. Therefore, the thickness of the electrical steel sheet 40 is preferably 0.35 mm or less, and more preferably 0.20 mm or 0.25 mm in consideration of iron loss characteristics of the electrical steel sheet 40.

The thickness of each of the electrical steel sheets 40 is, for example, 0.10 mm or more and 0.65 mm or less, preferably 0.10 mm or more and 0.35 mm or less, and more preferably 0.20 mm or 0.25 mm in consideration of the above points. Note that the thickness of the electrical steel sheet 40 also includes the thickness of the insulating coating.

The plurality of electrical steel sheets 40 forming the stator core 21 are bonded to each other with an adhesion layer 41. The adhesion layer 41 is arranged between the electrical steel sheets 40 adjacent to each other in a stacking direction. The adhesion layer 41 includes adhesive portions 42 and 43 which are cured adhesives. As the adhesive, for example, a thermosetting adhesive using polymerization bonding is used. As a composition of the adhesive, a composition containing (1) an acrylic resin, a composition containing (2) an epoxy-based resin, a composition containing (3) an acrylic resin and an epoxy-based resin, and the like can be applied. As such an adhesive, in addition to a thermosetting adhesive, a radical polymerization type adhesive and the like can be used, and it is desirable to use a room-temperature curing type adhesive from a viewpoint of productivity. The room-temperature curing type adhesive is cured at 20° C. to 30° C. As the room-temperature curing type adhesive, an acrylic adhesive is preferable. A typical acrylic adhesive is a second-generation acrylic adhesive (SGA) or the like. Any of an aerobic adhesive, an instantaneous adhesive, and an elastomer-containing acrylic adhesive can be used as long as the effects of the present disclosure are not impaired. Note that the adhesive here refers to an adhesive before curing, and the adhesive becomes the adhesion layer 41 after the adhesive is cured.

The adhesion layer 41 has an average tensile elastic modulus E of 1500 MPa to 4500 MPa at normal temperature (20° C. to 30° C.). When the average tensile elastic modulus E of the adhesion layer 41 is less than 1500 MPa, a problem that rigidity of the stacked core decreases occurs. Therefore, a lower limit value of the average tensile elastic modulus E of the adhesion layer 41 is 1500 MPa, and more preferably 1800 MPa. On the other hand, when the average tensile elastic modulus E of the adhesion layer 41 exceeds 4500 MPa, a problem that an insulating coating formed on a surface of the electrical steel sheet 40 is peeled off occurs. Therefore, an upper limit value of the average tensile elastic modulus E of the adhesion layer 41 is 4500 MPa, and more preferably 3650 MPa.

Note that the average tensile elastic modulus E is measured by a resonance method. Specifically, the tensile elastic modulus is measured in accordance with JIS R 1602:1995.

More specifically, first, a sample for measurement (not illustrated) is manufactured. This sample is obtained by bonding two electrical steel sheets 40 with an adhesive to be measured and curing the adhesive to form the adhesion layer 41. When the adhesive is a thermosetting type adhesive, this curing is performed by heating and pressurizing under heating and pressurizing conditions in actual operation. On the other hand, when the adhesive is a room-temperature curing type adhesive, this curing is performed by pressurizing at room temperature.

Then, the tensile elastic modulus of this sample is measured by a resonance method. A method for measuring the tensile elastic modulus by the resonance method is performed in accordance with JIS R 1602:1995 as described above. Thereafter, an influence of the electrical steel sheets 40 itself is removed from the tensile elastic modulus (measured value) of the sample by calculation to obtain the tensile elastic modulus of the adhesion layer 41 alone.

Since the tensile elastic modulus obtained from the sample in this manner is equal to an average value as the entire stacked core, this numerical value is regarded as the average tensile elastic modulus E. A composition is set such that the average tensile elastic modulus E hardly changes depending on a stacking position along the stacking direction or a position of the stacked core in the circumferential direction around the central axis. Therefore, the average tensile elastic modulus E can also be defined as a numerical value obtained by measuring the cured adhesion layer 41 at an upper end position of the stacked core.

As a bonding method, for example, a method can be adopted in which an adhesive is applied to the electrical steel sheets 40 and then the electrical steel sheets 40 are bonded by either or both of heating and pressure bonding. Note that a heating means may be any means such as heating in a high-temperature tank or an electric furnace or a direct energization method.

In order to stably obtain sufficient adhesive strength, the thickness of the adhesion layer 41 is preferably 1 μm or more.

On the other hand, when the thickness of the adhesion layer 41 exceeds 100 μm, an adhesive force is saturated. In addition, as the adhesion layer 41 becomes thicker, a space factor decreases, and magnetic characteristics such as iron loss of the stacked core deteriorate. Therefore, the thickness of the adhesion layer 41 is preferably 1 μm or more and 100 μm or less, and more preferably 1 μm or more and 10 μm or less.

Note that in the above description, the thickness of the adhesion layer 41 means the average thickness of the adhesion layer 41.

The average thickness of the adhesion layer 41 is more preferably 1.0 μm or more and 3.0 μm or less. When the average thickness of the adhesion layer 41 is less than 1.0 μm, a sufficient adhesive force cannot be ensured as described above. Therefore, a lower limit value of the average thickness of the adhesion layer 41 is 1.0 μm, and more preferably 1.2 μm. On the other hand, when the average thickness of the adhesion layer 41 is larger than 3.0 μm, a problem such as a significant increase in the amount of strain of the electrical steel sheet 40 due to shrinkage during thermal curing occurs. Therefore, an upper limit value of the average thickness of the adhesion layer 41 is 3.0 μm, and more preferably 2.6 μm.

The average thickness of the adhesion layer 41 is an average value as the entire stacked core. The average thickness of the adhesion layer 41 hardly changes depending on a stacking position along the stacking direction or a position of the stacked core in the circumferential direction around the central axis. Therefore, the average thickness of the adhesion layer 41 can be defined as an average value of numerical values measured at ten or more locations in the circumferential direction at an upper end position of the stacked core.

Note that the average thickness of the adhesion layer 41 can be adjusted, for example, by changing an application amount of the adhesive. In addition, the average tensile elastic modulus E of the adhesion layer 41 can be adjusted, for example, in a case of a thermosetting adhesive, by changing one or both of heating and pressurizing conditions applied at the time of bonding and the type of curing agent.

Note that, in the present embodiment, the plurality of electrical steel sheets 40 forming the rotor core 31 are fixed to each other with a crimp 51 (dowel). However, the plurality of electrical steel sheets 40 forming the rotor core 31 may be bonded to each other with the adhesion layer 41.

Note that the stacked core such as the stator core 21 or the rotor core 31 may be formed by so-called rotational stacking. Note that in the present embodiment, the stator core 21 is not obtained by rotational stacking. Therefore, rolling directions of the plurality of electrical steel sheets 40 forming the stator core 21 coincide with each other.

Figure 3:
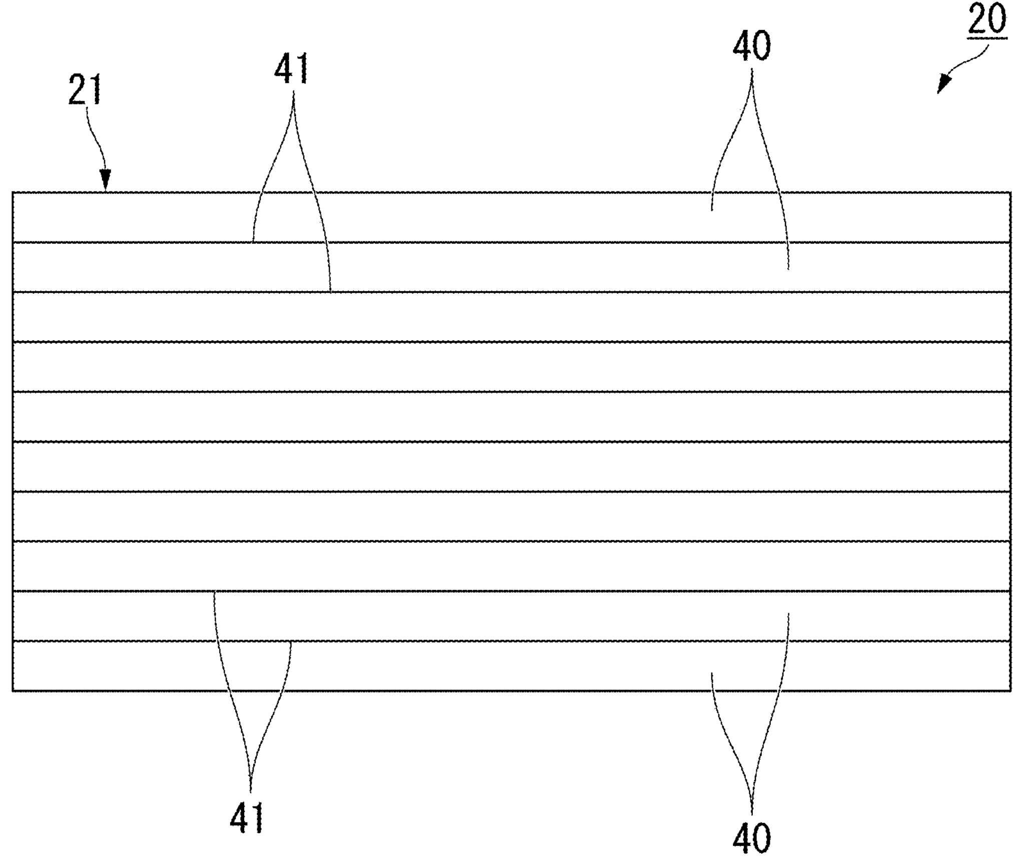
FIG. 3 is a side view of the stator included in the rotating electrical machine illustrated in FIG. 1.
Figure 4:
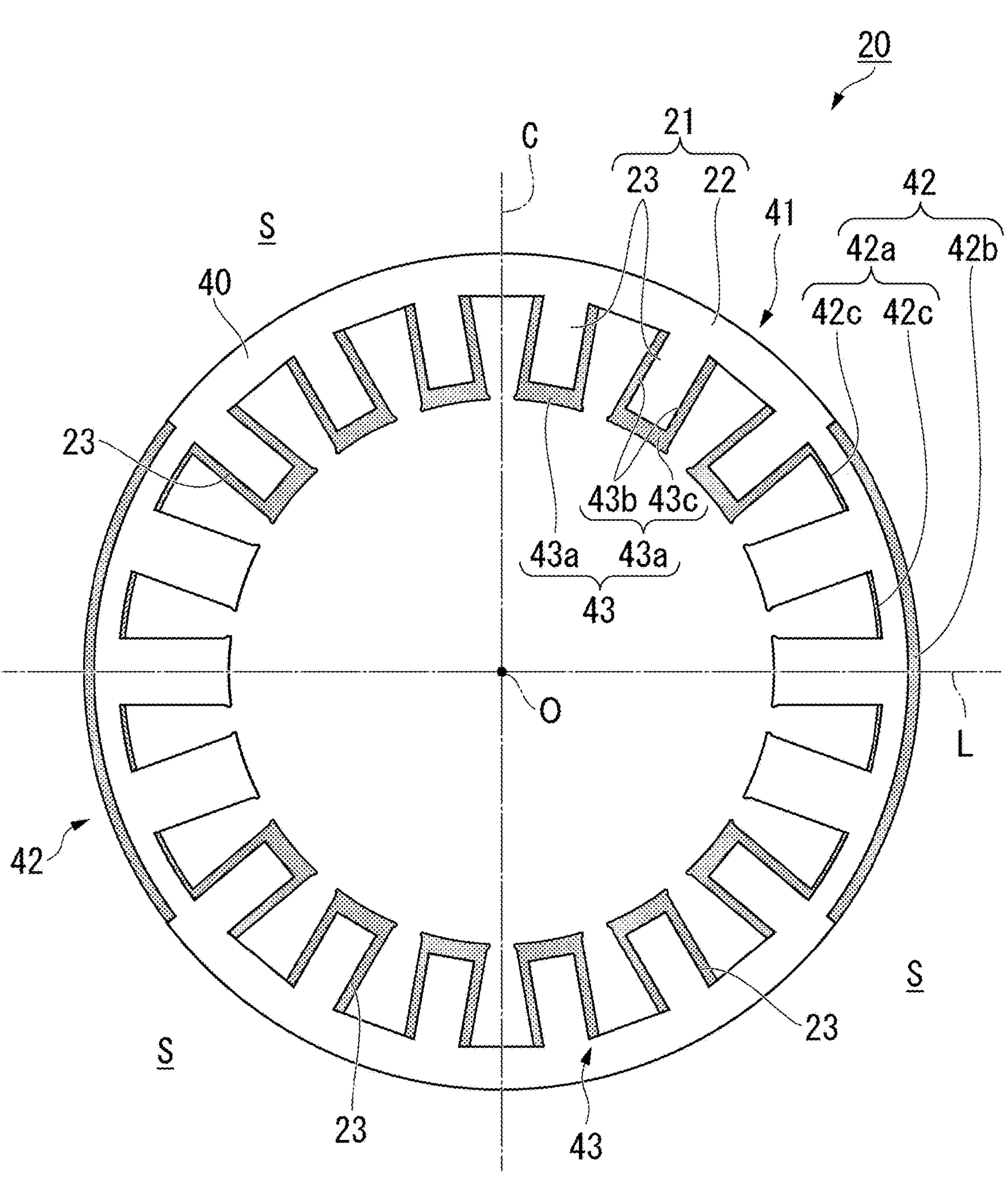
FIG. 4 is a plan view of an electrical steel sheet and an adhesion layer of the stator included in the rotating electrical machine illustrated in FIG. 1.

Here, as illustrated in FIGS. 3 and 4, in the present disclosure, in the stator core 21, the electrical steel sheets 40 adjacent to each other in the stacking direction are bonded to each other with the adhesion layer 41. In the illustrated example, the electrical steel sheets 40 adjacent to each other in the stacking direction are fixed only by bonding, and are not fixed by another means (for example, crimping). Note that the electrical steel sheets 40 may be bonded to each other with the adhesion layer 41 after being fixed to each other by another means.

Figure 5:
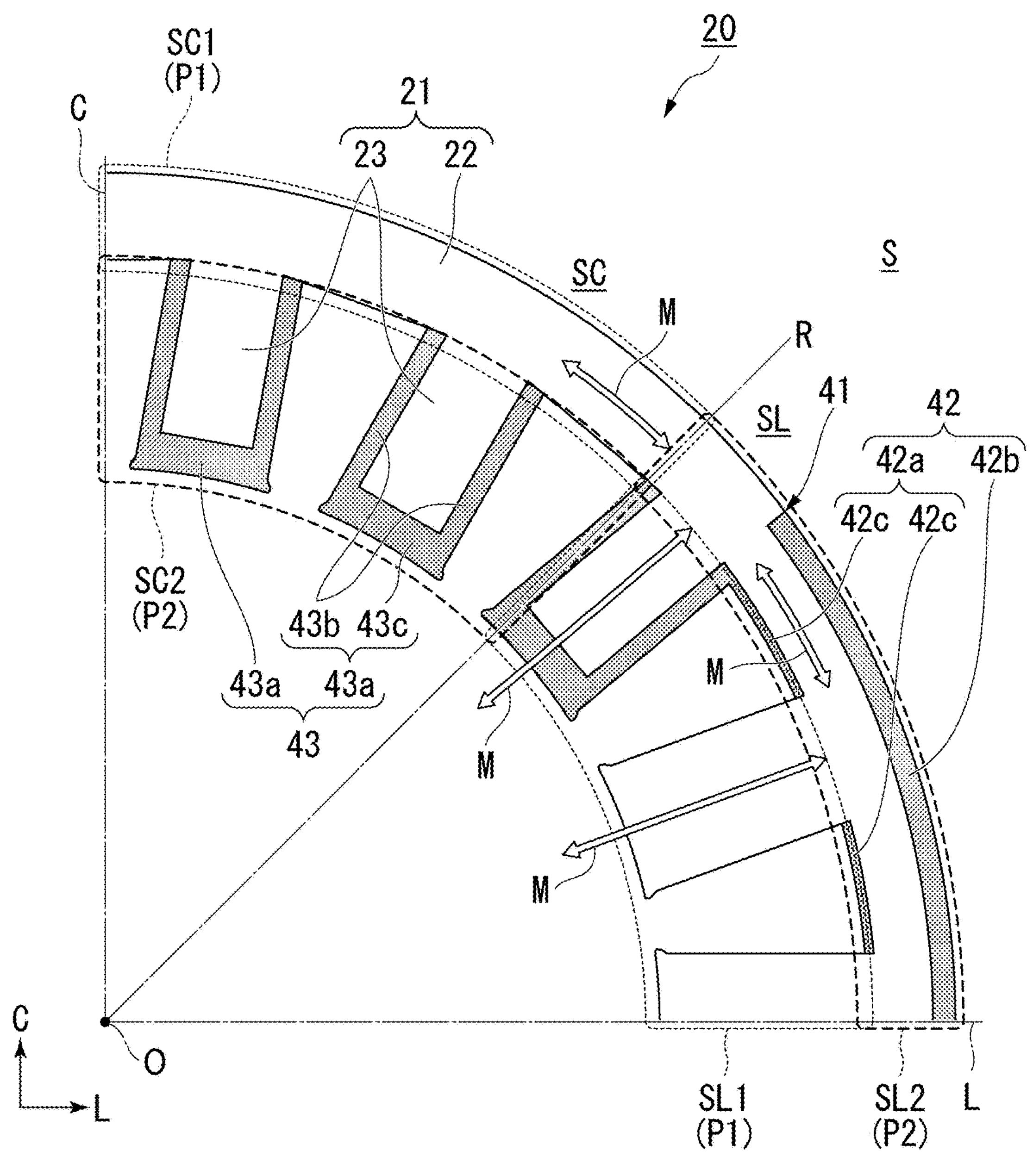
FIG. 5 is a plan view of an electrical steel sheet and an adhesion layer, and is an enlarged view of one section partitioned by an L-axis and a C-axis.

As illustrated in FIGS. 4 and 5 (The same applies to FIGS. 9, 10, 11, and 15 described later.), in the present embodiment, the electrical steel sheets 40 adjacent to each other in the stacking direction are bonded to each other with the adhesion layer 41. Note that in the present embodiment, the plane view shapes of all the adhesion layers 41 arranged between the electrical steel sheets 40 are the same. The plane view shape of the adhesion layer 41 means the entire shape of the adhesion layer 41 in plan view when the electrical steel sheet 40 including the adhesion layer 41 is viewed from the stacking direction. The plane view shapes of all the adhesion layers 41 disposed between the electrical steel sheets 40 being the same includes not only a case where the plane view shapes of all the adhesion layers 41 disposed between the electrical steel sheets 40 are completely the same but also a case where the plane view shapes are substantially the same. The case where the plane view shapes are substantially the same is a case where the plane view shapes of all the adhesion layers 41 arranged between the electrical steel sheets 40 are common in 90% or more portions.

Each of the adhesion layers 41 includes a first adhesive portion 42 and a second adhesive portion 43. The first adhesive portion 42 is disposed on at least one of an inner peripheral edge and an outer peripheral edge of the core back 22. The first adhesive portion 42 extends in a belt shape along at least one of the inner peripheral edge and the outer peripheral edge of the core back 22. The second adhesive portion 43 is disposed on a peripheral edge of the teeth 23. The second adhesive portion 43 extends in a belt shape along the peripheral edge of the teeth 23.

Here, the belt shape includes a shape in which the width of the belt changes in the middle and a shape in which the middle position of the belt is divided. For example, a shape in which each of individual portions has a predetermined shape such as a circular shape or a quadrangular shape but the individual portions are continuous in one direction without being divided, and a shape in which two adjacent individual portions are separated from each other but a separation distance therebetween is relatively small and which is a belt shape as a whole (as a set of the individual portions described above) are also included in the belt shape extending in one direction. In the belt-shaped adhesive portions 42 and 43, for example, an aspect ratio (long/short side ratio) of each of the adhesive portions 42 and 43 is five times or more (the long side has a length five times or more the short side). The adhesive portions 42 and 43 being along the peripheral edge is not based on the premise that the adhesive portions 42 and 43 have a shape continuous in one direction. For example, a case where the plurality of adhesive portions 42 and 43 are intermittently disposed in one direction is also included. Note that in this case, an interval (length in one direction) between the pair of adhesive portions 42 and 43 adjacent to each other in one direction is preferably larger than the size (length in one direction) of each of the pair of adhesive portions 42 and 43. In such belt-shaped adhesive portions 42 and 43, the one direction is the longitudinal direction. The longitudinal direction of the belt-shaped adhesive portions 42 and 43 is, for example, a direction in which a long side of each of the adhesive portions 42 and 43 having an aspect ratio of five times or more extends.

The adhesive portions 42 and 43 being along the peripheral edge includes not only a case where the adhesive portions 42 and 43 are arranged without a gap from the peripheral edge but also a case where the adhesive portions 42 and 43 are arranged with a gap with respect to the peripheral edge of the electrical steel sheet 40. Note that in this case, the adhesive portions 42 and 43 being along the peripheral edge means that the adhesive portions 42 and 43 extend substantially parallel to the target peripheral edge. In other words, the adhesive portions 42 and 43 being along the peripheral edge includes not only a case where the adhesive portions 42 and 43 are completely parallel to the peripheral edge but also a case where the adhesive portions 42 and 43 have an inclination of, for example, five degrees or less to the peripheral edge. The adhesive portions 42 and 43 being along the peripheral edge does not include a case where the adhesive portions 42 and 43 are arranged with a gap exceeding a certain width with respect to the peripheral edge of the electrical steel sheet 40. Specifically, the adhesive portions 42 and 43 are arranged in a range not exceeding a width three times a size corresponding to the sheet thickness of the electrical steel sheet 40 from the peripheral edge of the electrical steel sheet 40. A distance (width) between the adhesive portions 42 and 43 and the peripheral edge of the electrical steel sheet 40 is preferably equal to or less than the sheet thickness of the electrical steel sheet 40, and only needs to be equal to or less than three times the sheet thickness. Note that when the distance is 0, the adhesive portions 42 and 43 are arranged without a gap on the peripheral edge of the electrical steel sheet 40.

In the present embodiment, as illustrated in FIGS. 4 and 5, the first adhesive portion 42 includes both an inner adhesive portion 42*a* disposed on an inner peripheral edge of the core back 22 and an outer adhesive portion 42*b* disposed on an outer peripheral edge of the core back 22. Each of the inner adhesive portion 42*a* and the outer adhesive portion 42*b* extends in the circumferential direction. The inner adhesive portion 42*a* and the outer adhesive portion 42*b* are disposed at equal positions in the circumferential direction. The inner adhesive portion 42*a* is disposed inside the outer adhesive portion 42*b* in the radial direction. The inner adhesive portion 42*a* intermittently extends in the circumferential direction. The outer adhesive portion 42*b* continuously extends in the circumferential direction.

The inner adhesive portion 42*a* is disposed at a portion where the teeth 23 are not disposed in the inner peripheral edge of the core back 22. The inner adhesive portion 42*a* includes partial adhesive portions 42*c* disposed at intervals in the circumferential direction. The partial adhesive portion 42*c* is located between the teeth 23 adjacent in the circumferential direction on the inner peripheral edge of the core back 22. The partial adhesive portion 42*c* extends over the total length between the teeth 23 on the inner peripheral edge of the core back 22.

Note that, as illustrated in FIG. 5, the width of the inner adhesive portion 42*a* may be narrower than the width of the outer adhesive portion 42*b*. In the core back 22, a magnetic flux is more likely to be generated on the inner peripheral edge than on the outer peripheral edge, and iron loss is reduced by reducing the width (area) of the adhesive portion on the inner peripheral edge.

The second adhesive portions 43 are intermittently disposed in the circumferential direction. The second adhesive portion 43 includes a plurality of teeth adhesive portions 43*a* disposed on the teeth 23, respectively. The teeth adhesive portion 43*a* has a U-shape in plan view when the electrical steel sheet 40 is viewed from the stacking direction. The teeth adhesive portion 43*a* includes two side edge portions 43*b* and one end edge portion 43*c*. The two side edge portions 43*b* are arranged on two side edges of one tooth 23. The two side edge portions 43*b* are disposed at intervals in the circumferential direction. Each of the side edge portions 43*b* extends in a belt shape in the radial direction. One end edge portion 43*c* is arranged at an end (an inner end in the radial direction in the illustrated example) of one tooth 23. Each of the side edge portions 43*b* extends in a belt shape in the radial direction. The end edge portion 43*c* extends in a belt shape in the circumferential direction. Note that the end edge portion 43*c* prevents peeling of an end of the tooth 23 when an external force is applied to the end of the tooth 23. The external force may be applied to the tooth 23 when a winding is inserted into a slot, for example.

In the present embodiment, the first adhesive portion 42 and the second adhesive portion 43 are alternately arranged in the circumferential direction. In the illustrated example, an end portion of the first adhesive portion 42 (inner adhesive portion 42*a*) in the circumferential direction and an end portion of the second adhesive portion 43 (side edge portion 43*b*) in the circumferential direction are continuous in the circumferential direction. The first adhesive portion 42 and the second adhesive portion 43 are alternately disposed over the whole circumference in the circumferential direction. Two first adhesive portions 42 and two second adhesive portions 43 are disposed. Each of the first adhesive portion 42 and the second adhesive portion 43 is disposed on about ¼ of the circumference.

Here, an L-axis and a C-axis are defined. Both the L-axis and the C-axis are imaginary axes intersecting with the central axis (central axis O) of the core back 22. The L-axis extends in the easy-magnetization direction. Note that in the present embodiment, the electrical steel sheet is a non-oriented electrical steel sheet, and the L-axis extends in the rolling direction and the easy-magnetization direction. That is, in the present embodiment, the easy-magnetization direction and the rolling direction coincide with each other. The C-axis is orthogonal to (intersects with) the L-axis. Hereinafter, a direction in which the L-axis extends is referred to as an L direction, and a direction in which the C-axis extends is referred to as a C direction.

Note that in the present embodiment, only one easy-magnetization direction exists in one electrical steel sheet 40. The easy-magnetization direction can be determined by, for example, (1) confirming grains of the electrical steel sheet 40 or (2) magnetically measuring the electrical steel sheet 40. In any of the above determination methods (1) and (2), for example, first, the electrical steel sheet 40 to be measured is taken out from the stator core 21 by, for example, peeling.

Thereafter, in the method (1) for confirming grains of the electrical steel sheet 40, for example, an inverse curve diagram (100) is created in a direction parallel to a rolled surface with a reflection electron microscope (EBSD), and a direction with the highest strength may be used as the easy-magnetization direction (Reference Document: "EBSD Reader=In Using OIM=(B4.00)", written by Seiichi Suzuki, TSL Solutions, Inc., URL: https://www.tsljapan.com/archives/3380).

On the other hand, as the method (2) for magnetically measuring the electrical steel sheet 40, for example, there is a method in which a rectangular or square steel sheet inclined at a predetermined angle from a rolling direction is cut out to obtain a measurement sample, and measurement is performed based on the method for magnetically measuring an electrical steel strip with a single sheet tester defined in JIS C 2556:2015. In this case, the easy-magnetization direction can be determined by preparing a plurality of the above-described measurement samples with different inclination angles with respect to the rolling direction and comparing measurement results of the plurality of measurement samples.

Here, in the present disclosure, when the number of easy-magnetization directions is counted (for example, whether the number of easy-magnetization directions is one or more), directions opposite by 180° around the central axis O are counted as the same direction (one direction). For example, a 0° direction and a 180° direction are counted as the same direction (one direction). For example, a direction of +X° and a direction of +(X+180)° in one direction around the central axis O with respect to the rolling direction are counted as the same direction (one direction).

Figure 6:
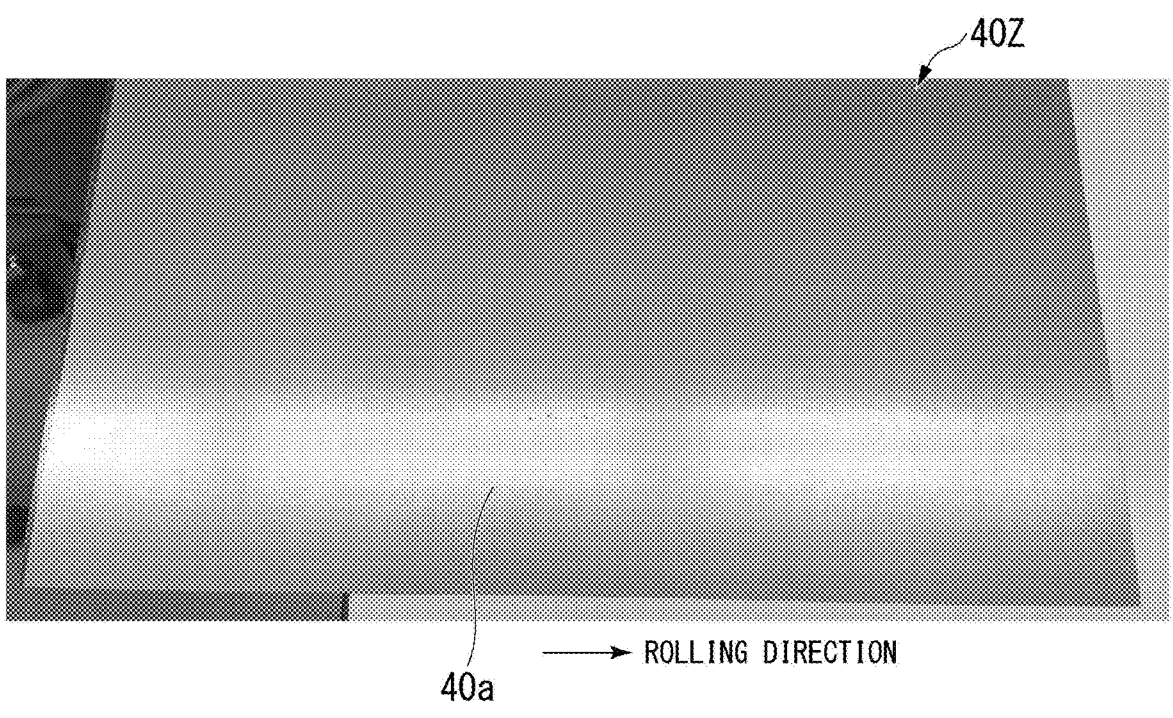
FIG. 6 is a photograph for explaining a roll mark, and is a photograph indicating a general electrical steel sheet.
Figure 7:
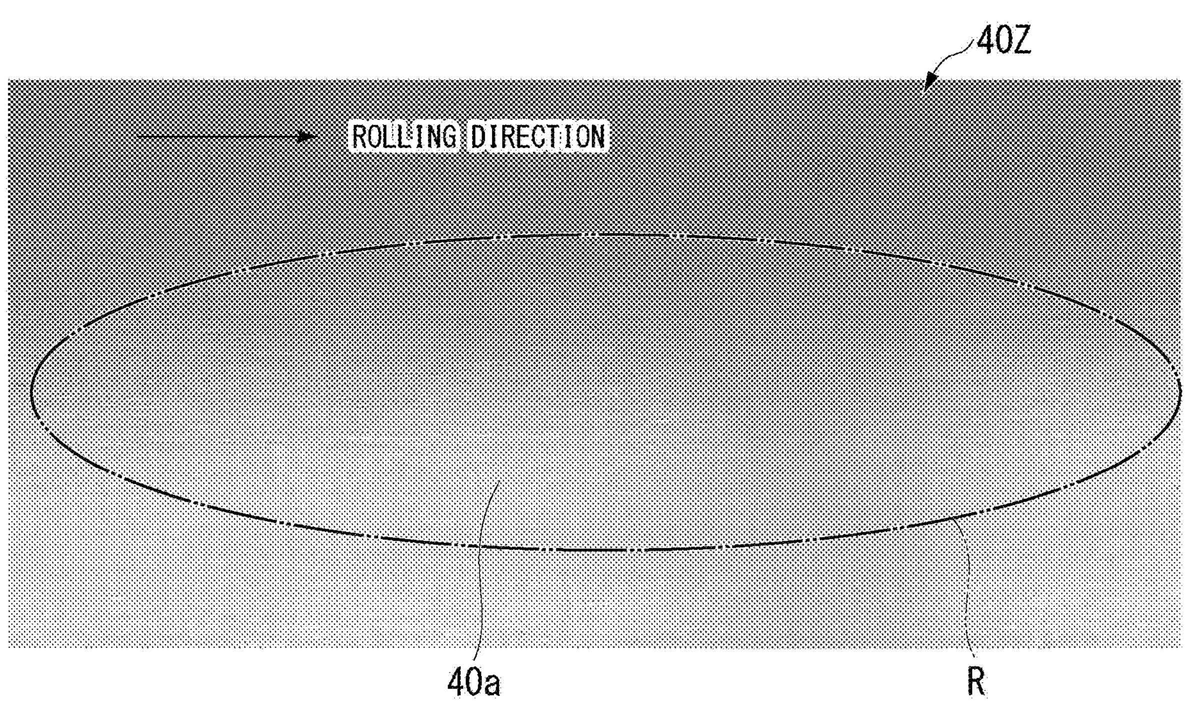
FIG. 7 is an enlarged photograph of a part of the photograph indicated in FIG. 7.

The rolling direction can be determined by a roll mark 40*a* illustrated in FIGS. 6 and 7. FIGS. 6 and 7 are photographs illustrating a general electrical steel sheet 40Z. Note that a similar roll mark 40*a* can also be confirmed in the electrical steel sheet 40 included in the stator core 21.

The roll mark 40*a* is a linear defect formed on surfaces of the electrical steel sheets 40 and 40Z by a roll for rolling at the time of rolling the electrical steel sheets 40 and 40Z. It can also be said that the roll mark 40*a* is a streak extending in the rolling direction. The roll mark 40*a* can be visually confirmed by a person. For example, in the electrical steel sheet 40 illustrated in FIGS. 6 and 7, it can be confirmed that there is the roll mark 40*a* (defect, streak) extending in a left-right direction with respect to the paper surface (For example, the roll mark 40*a* is visually recognized easily in a range R in FIG. 7.).

Note that when the rolling direction of the electrical steel sheet 40 included in the stator core 21 is determined, for example, preferably, the electrical steel sheet 40 is taken out from the stator core 21 and then the electrical steel sheet 40 is observed in a state where the adhesion layer 41 is removed from the surface of the electrical steel sheet 40.

As illustrated in FIGS. 4 and 5, the above-described two first adhesive portions 42 (see FIG. 4) are line-symmetric with respect to the C-axis (or L-axis). The two second adhesive portions 43 are line-symmetric in the C direction with respect to the L-axis.

Furthermore, as illustrated in FIG. 5, the electrical steel sheet 40 is partitioned into a plurality of sections S. In the embodiment illustrated in FIG. 5, the electrical steel sheet 40 is partitioned into four sections. The four sections S are sections S obtained by partitioning the electrical steel sheet 40 into four equal parts by the L-axis and the C-axis. Among the four sections S, two sections adjacent to each other with the C-axis (or L-axis) interposed therebetween are line-symmetric with each other with respect to the C-axis (or L-axis). Among these four sections S, two sections located at positions rotated by 180 degrees around the central axis (central axis O) are point-symmetric with each other around the central axis (central axis O).

Here, in each of the four sections S, a reference axis R, a C-axis side region SC, and an L-axis side region SL are defined. The reference axis R is an imaginary line passing through the center (center in the circumferential direction) of the C-axis and the L-axis, and in the present embodiment, the reference axis R is an imaginary axis extending while being inclined by 45° with respect to each of the C-axis and the L-axis. The reference axis R extends in a direction that divides a central angle formed by the C-axis and the L-axis around the central axis O into two equal parts. The C-axis side region SC is a region relatively close to the C-axis. That is, at each position belonging to the C-axis side region SC, a distance to the C-axis is shorter than a distance to the L-axis. In other words, the C-axis side region SC is a region sandwiched between the reference axis R and the C-axis. The L-axis side region SL is a region relatively close to the L-axis. That is, at each position belonging to the L-axis side region SL, a distance to the L-axis is shorter than a distance to the C-axis. In other words, the L-axis side region SL is a region sandwiched between the reference axis R and the L-axis. The C-axis side region SC and the L-axis side region SL have the same area. The C-axis side region SC and the L-axis side region SL are line-symmetric with each other with respect to the reference axis R. In the present embodiment, the C-axis side region SC is an entire region located within a range of a predetermined central angle from the C-axis toward the L-axis around the central axis O. The L-axis side region SL is an entire region located within a range of a predetermined central angle from the L-axis toward the C-axis around the central axis O. In the present embodiment, the central angle of each of the C-axis side region SC and the L-axis side region SL is 45°. The C-axis side region SC is an entire region located on the L-axis side with respect to the reference axis R. The L-axis side region SL is an entire region located on the C-axis side with respect to the reference axis R.

By the way, the inventor of the present application has found the following findings (1) and (2).

(1) In the stator core 21 including the core back 22, a main magnetic flux M is generated mainly in a circumferential direction in the core back 22. In the core back 22, the direction in which the main magnetic flux M is generated is the circumferential direction. A relative relationship between the main magnetic flux M generated in the core back 22 and the L direction or the C direction differs depending on a position where the main magnetic flux M is generated in the circumferential direction. For example, in a portion of the core back 22 located on an L-axis side, the number of components of the main magnetic flux M in the C direction increases. On the other hand, in a portion of the core back 22 located on a C-axis side, the number of components of the main magnetic flux M in the L direction increases.

(2) In the stator core 21 including the teeth 23, the main magnetic flux M is generated mainly in a radial direction in the tooth 23. In the tooth 23, the direction in which the main magnetic flux M is generated is the radial direction. A relative relationship between the main magnetic flux M generated in the tooth 23 and the L direction or the C direction differs depending on the position of the tooth 23 where the main magnetic flux M is generated in the circumferential direction. For example, the number of components of the main magnetic flux M in the L direction increases in the tooth 23 located on the L-axis side among the plurality of teeth 23. On the other hand, the number of components of the main magnetic flux M in the C direction increases in the tooth 23 located on the C-axis side among the plurality of teeth 23.

Therefore, the inventor of the present application defines a portion of the electrical steel sheet 40 where the main magnetic flux M is generated in the L direction as a first portion P1. The inventor of the present application defines a portion of the electrical steel sheet 40 where the main magnetic flux M is generated in the C direction as a second portion P2. For example, in each portion of the electrical steel sheet 40, when the main magnetic flux M is decomposed into an L direction component and a C direction component, in the electrical steel sheet 40, a portion where the number of components of the main magnetic flux M in the L direction increases may be defined as the first portion P1, and a portion where the number of components of the main magnetic flux M in the C direction increases may be defined as the second portion P2.

Based on the above findings (1) and (2), the inventor of the present application has defined each of the first portion P1 and the second portion P2 by whether a direction of the main magnetic flux M flowing through each portion of the target electrical steel sheet 40 is relatively close to the L direction or the C direction. Specifically, the inventor of the present application defines the first portion P1 and the second portion P2 as follows (see FIG. 5). That is, the first portion P1 includes <1-1> a portion SC1 of the core back 22 located in the C-axis side region SC and <1-2> a portion SL1 of the teeth 23 located in the L-axis side region SL. The second portion P2 includes <2-1> a portion SL2 of the core back 22 located in the L-axis side region SL and <2-2> a portion SC2 of the teeth 23 located in the C-axis side region SC. As illustrated in FIG. 5, when the reference axis R passes over one tooth 23, the one tooth 23 is partitioned into two portions of the portions SL1 and SL2.

In the present embodiment, the area of the adhesion layer 41 in the first portion P1 is smaller than the area of the adhesion layer 41 in the second portion P2 in all of the above-described four sections S.

Here, the adhesion layer 41 in the first portion P1 includes <1-1> the adhesion layer 41 arranged in the portion SC1 of the core back 22 located in the C-axis side region SC and <1-2> the adhesion layer 41 arranged in the portion SL1 of the teeth 23 located in the L-axis side region SL. That is, the adhesion layer 41 in the first portion P1 includes <1-1> the first adhesive portion 42 in the C-axis side region SC (portion SC1) and <1-2> the second adhesive portion 43 in the L-axis side region SL (portion SL1).

The adhesion layer 41 in the second portion P2 includes <2-1> the adhesion layer 41 arranged in the portion SL2 of the core back 22 located in the L-axis side region SL and <2-2> the adhesion layer 41 arranged in the portion SC2 of the teeth 23 located in the C-axis side region SC. That is, the adhesion layer 41 in the second portion P2 includes <2-1> the first adhesive portion 42 in the L-axis side region SL (portion SL2) and <2-2> the second adhesive portion 43 in the C-axis side region SC (portion SC2).

Note that in the example illustrated in FIG. 5, the area of the electrical steel sheet 40 in each of the first portion P1 and the second portion P2 and the area of the adhesion layer 41 in each of the first portion P1 and the second portion P2 can be set as illustrated in Table 1 below.

TABLE 1

| | | Area of electrical steel sheet [$mm^2$] | Area of adhesive layer [$mm^2$] | Adhesive area ratio [%] | Adhesive area ratio (first portion and second portion) [%] |
|---|---|---|---|---|---|
| First portion | SL1 (P1, teeth) | 1271.8 | 259.1 | 20.4 | 11.7 |
| | SC1 (P1, yoke) | 944.4 | 0.0 | 0.0 | |
| Second portion | SC2 (P2, teeth) | 706.6 | 518.2 | 73.3 | 41.3 |
| | SL2 (P2, yoke) | 1225.9 | 279.4 | 22.8 | |

Furthermore, as illustrated in Table 1, the area of the first adhesive portion 42 in the C-axis side region SC (the area of the adhesion layer 41 in the portion SC1) is smaller than the area of the first adhesive portion 42 in the L-axis side region SL (the area of the adhesion layer 41 in the portion SL2). The area of the second adhesive portion 43 in the C-axis side region SC (the area of the adhesion layer 41 in the portion SC2) is larger than the area of the second adhesive portion 43 in the L-axis side region SL (the area of the adhesion layer 41 in the portion SL1).

Note that in the example illustrated in FIG. 5, the area of the electrical steel sheet 40 in each of the L-axis side region and the C-axis side region of each section S and the area of the adhesion layer 41 in each of the L-axis side region and the C-axis side region of each section S can also be set as illustrated in Table 2 below. As described above, in each section S, the area of the adhesion layer 41 in the C-axis side region SC is different from the area of the adhesion layer 41 in the L-axis side region SL.

TABLE 2

| | Area of electrical steel sheet [$mm^2$] | Area of adhesive layer [$mm^2$] | Adhesive area ratio [%] |
|---|---|---|---|
| L-axis side region | 2497.7 | 538.5 | 21.6 |
| C-axis side region | 1651.0 | 518.2 | 31.4 |

In the illustrated example, in all the above-described four sections S, the width of the first adhesive portion 42 is equal regardless of a position in the circumferential direction, or decreases from the L-axis toward the C-axis along the circumferential direction. In the present embodiment (see FIGS. 4 and 5), the width of each of the plurality of partial adhesive portions 42*c* constituting the first adhesive portion 42 and the width of the outer adhesive portion 42*b* are equal regardless of a position in the circumferential direction. The widths of the plurality of partial adhesive portions 42*c* are equal to each other. Note that in another embodiment, the width of at least one of the plurality of partial adhesive portions 42*c* may be different from the width of the other partial adhesive portions 42*c*.

Here, the width of the adhesive portion (for example, the first adhesive portion 42) is the size of the adhesive portion extending in a belt shape in a direction orthogonal to an extending direction (longitudinal direction) of the adhesive portion. The width of the adhesive portion being equal regardless of a position in the circumferential direction includes not only a case where the width of the adhesive portion is completely equal regardless of a position in the circumferential direction but also a case where the width of the adhesive portion is substantially equal regardless of a position in the circumferential direction. The case where the width of the adhesive portion is substantially equal is a case where the width of the adhesive portion varies by about 10% with respect to an average width of the corresponding adhesive portion.

Furthermore, in the illustrated example, in all the above-described four sections S, the width of the second adhesive portion 43 is equal regardless of the position of the tooth 23 in the circumferential direction, or larger for the tooth 23 located closer to the C-axis side than for the tooth 23 located closer to the L-axis side along the circumferential direction. Note that in the present embodiment, the width of the second adhesive portion 43 is equal regardless of the position of the tooth 23 in the circumferential direction.

In the L-axis side region SL, the total area of the belt-shaped adhesive portions 42 and 43 whose circumferential direction is the longitudinal direction is larger than the total area of the belt-shaped adhesive portions 42 and 43 whose radial direction is the longitudinal direction. Furthermore, in the C-axis side region SC, the total area of the belt-shaped adhesive portions 42 and 43 whose circumferential direction is the longitudinal direction is smaller than the total area of the belt-shaped adhesive portions 42 and 43 whose radial direction is the longitudinal direction. Here, examples of the belt-shaped adhesive portions 42 and 43 whose circumferential direction is the longitudinal direction include the inner adhesive portion 42*a*, the outer adhesive portion 42*b*, and the end edge portion 43*c*. Examples of the belt-shaped adhesive portions 42 and 43 whose radial direction is the longitudinal direction include the side edge portion 43*b*. The belt-shaped adhesive portions 42 and 43 whose circumferential direction is the longitudinal direction includes not only the adhesive portions 42 and 43 extending in a curved shape parallel to the circumferential direction but also, for example, the adhesive portions 42 and 43 extending linearly in the circumferential direction. The belt-shaped adhesive portions 42 and 43 whose radial direction is the longitudinal direction includes not only the adhesive portions 42 and 43 extending linearly in the radial direction but also, for example, the adhesive portions 42 and 43 extending in a curved shape in the radial direction.

Note that the area of the adhesion layer 41 is the area of a region where the adhesive portions 42 and 43 are arranged in the electrical steel sheet 40. This area is obtained, for example, by photographing surfaces of the adjacent electrical steel sheets 40 after the electrical steel sheets 40 are peeled off from each other, and performing image analysis on the photographing result.

Figure 8:
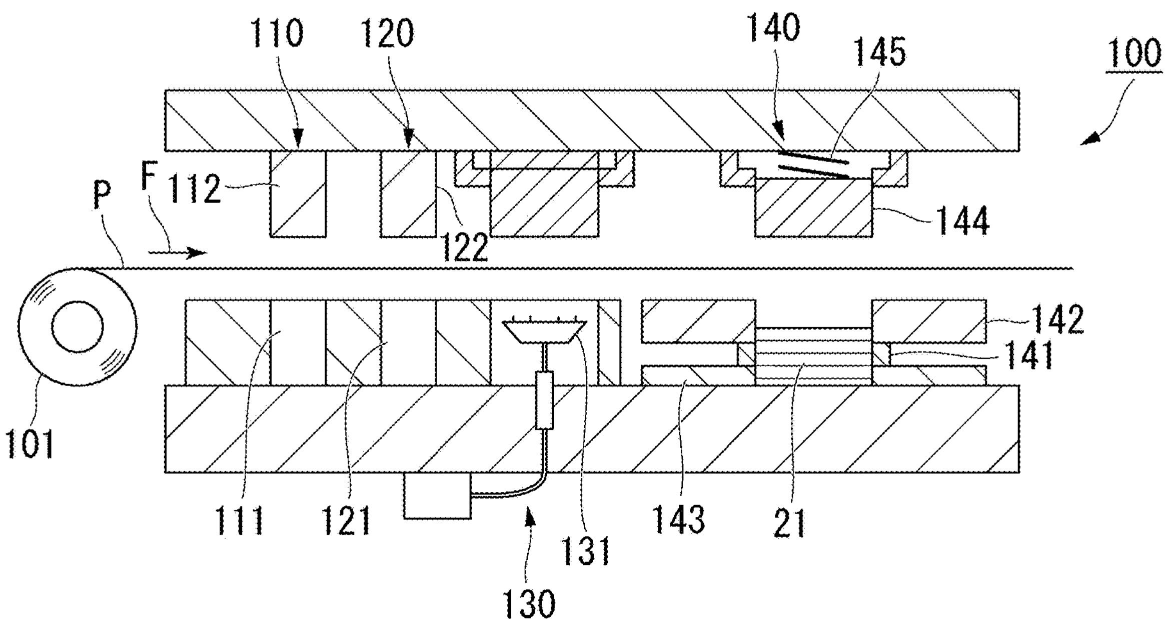
FIG. 8 is a side view illustrating an example of a manufacturing apparatus for manufacturing the stator included in the rotating electrical machine illustrated in FIG. 1.

The stator core 21 is manufactured using, for example, a manufacturing apparatus 100 illustrated in FIG. 8. Hereinafter, a method for manufacturing the stator core 21 will be described. Note that the manufacturing method is not limited thereto. First, the manufacturing apparatus 100 will be described. In the manufacturing apparatus 100, while feeding an electrical steel sheet P from a coil 101 (hoop) in a direction of an arrow F, punching is performed a plurality of times with a die disposed on each stage to gradually form the electrical steel sheet P into the shape of the electrical steel sheet 40, an adhesive is applied to a lower surface of the electrical steel sheet 40, and the punched electrical steel sheets 40 are stacked and pressure-bonded while the temperature is raised to form each adhesion layer 41.

The manufacturing apparatus 100 includes a first-stage punching station 110 disposed closest to the coil 101, a second-stage punching station 120 disposed downstream of the punching station 110 in a conveyance direction of the electrical steel sheet P so as to be adjacent to the punching station 110, and an adhesive application station 130 disposed further downstream of the punching station 120 so as to be adjacent to the punching station 120.

The punching station 110 includes a female die 111 disposed below the electrical steel sheet P and a male die 112 disposed above the electrical steel sheet P.

The punching station 120 includes a female die 121 disposed below the electrical steel sheet P and a male die 122 disposed above the electrical steel sheet P.

The adhesive application station 130 includes an applicator 131 including a plurality of injectors disposed according to an application pattern of an adhesive.

The manufacturing apparatus 100 further includes a stacking station 140 downstream of the adhesive application station 130. The stacking station 140 includes a heating device 141, an outer peripheral punching female die 142, a heat insulating member 143, an outer peripheral punching male die 144, and a spring 145.

The heating device 141, the outer peripheral punching female die 142, and the heat insulating member 143 are disposed below the electrical steel sheet P. On the other hand, the outer peripheral punching male die 144 and the spring 145 are disposed above the electrical steel sheet P. Note that reference numeral 21 denotes a stator core.

In the manufacturing apparatus 100 having the configuration described above, first, the electrical steel sheet P is sequentially fed from the coil 101 in the direction of the arrow F in FIG. 8. Then, the electrical steel sheet P is first punched by the punching station 110. Subsequently, the electrical steel sheet P is punched by the punching station 120. By the punching, the electrical steel sheet P obtains the shape of the electrical steel sheet 40 including the core back 22 and the plurality of teeth 23 illustrated in FIGS. 2 and 3. Note that the electrical steel sheet P is not completely punched at this time point, and therefore the process proceeds to a next step along the direction of the arrow F. In the adhesive application station 130 as the next step, an adhesive supplied from each injector of the applicator 131 is applied in dots.

Finally, the electrical steel sheet P is fed to the stacking station 140, punched by the outer peripheral punching male die 144, and stacked with high accuracy. At the time of this stacking, the electrical steel sheet 40 receives a constant pressure from the spring 145. By sequentially repeating the punching step, the adhesive applying step, and the stacking step as described above, a predetermined number of electrical steel sheets 40 can be stacked. Furthermore, the stacked core formed by stacking the electrical steel sheets 40 in this manner is heated to, for example, a temperature of 200° C. by the heating device 141. By this heating, the adhesive is cured to form the adhesion layer 41.

Through the above steps, the stator core 21 is completed.

As a result of intensive studies, the inventor of the present application has obtained the following findings. That is, the inventor of the present application has newly found that, in the stator core 21 in which the electrical steel sheets 40 adjacent to each other in the stacking direction are bonded and fixed to each other by an adhesive, a compressive stress is applied to the electrical steel sheets 40 due to the adhesive, and this compressive stress affects deterioration (the amount of an increase in iron loss or the like) of magnetic characteristics of the electrical steel sheets 40. The degree of this influence varies depending on a direction of the main magnetic flux M generated in the electrical steel sheets 40. More specifically, in a case where the direction of the main magnetic flux M is the L direction, as compared with a case where the direction of the main magnetic flux M is the C direction, the higher an adhesive area ratio in the electrical steel sheet 40, the larger an iron loss deterioration ratio, and the higher a compressive stress applied per unit area of the electrical steel sheet 40, the larger the iron loss deterioration ratio (See FIGS. 13, 14, and 16 described later.).

Based on the above findings, the inventor of the present application has reached that, in the stator core 21 including the core back 22, the electrical steel sheet 40 is partitioned into four sections S by the L-axis and the C-axis, and in at least one of the four sections S, the area of the adhesion layer 41 is made different depending on a direction in which the main magnetic flux M is generated. For example, in the four sections S, the area of the adhesion layer 41 in the first portion P1 where the main magnetic flux M is generated in the L direction is made smaller than the area of the adhesion layer 41 in the second portion P2 where the main magnetic flux M is generated in the C direction. As a result, instead of forming the large adhesion layer 41 in a portion having a large influence on iron loss in the electrical steel sheet 40, the large adhesion layer 41 can be formed in a portion having a small influence on iron loss. Therefore, it is possible to suppress an increase in loss while ensuring a required holding force. It can be said that such a configuration is reached only when attention is paid to application of a compressive stress to the electrical steel sheet 40 due to contraction of the adhesive. That is, it can be said that such a configuration cannot be reached on the premise of a stacked core that fixes the electrical steel sheet 40 in a direction different from adhesion (for example, crimping or welding).

The first adhesive portion 42 is disposed on at least one of an inner peripheral edge and an outer peripheral edge of the core back 22 and extends mainly in a circumferential direction. Therefore, the first adhesive portion 42 extends, in the C-axis side region SC, in a direction closer to the L direction than the C direction (having a gentle inclination), and extends, in the L-axis side region SL, in a direction closer to the C direction than the L direction (having a gentle inclination). Therefore, as for the first adhesive portion 42, as the number of portions disposed in the L-axis side region SL increases, a ratio of the first adhesive portion 42 extending in the direction close to the C direction increases, and an influence on iron loss decreases.

Therefore, in the stator core 21, in each section S, the area of the first adhesive portion 42 in the C-axis side region SC is smaller than the area of the first adhesive portion 42 in the L-axis side region SL. Therefore, an influence of the first adhesive portion 42 on iron loss can be suppressed to be small.

The second adhesive portion 43 is disposed on a peripheral edge of the teeth 23 and extends mainly in a radial direction. Therefore, the second adhesive portion 43 extends, in the C-axis side region SC, in a direction closer to the C direction than the L direction (having a gentle inclination), and extends, in the L-axis side region SL, in a direction closer to the L direction than the C direction (having a gentle inclination). Therefore, as for the second adhesive portion 43, as the number of portions disposed in the C-axis side region SC increases, a ratio of the second adhesive portion 43 extending in the direction close to the C direction increases, and an influence on iron loss decreases.

Therefore, in the stator core 21, in each section S, the area of the second adhesive portion 43 in the C-axis side region SC is larger than the area of the second adhesive portion 43 in the L-axis side region SL. Therefore, an influence of the second adhesive portion 43 on iron loss can be suppressed to be small.

Note that the technical scope of the present disclosure is not limited only to the above-described embodiment, and various modification can be made without departing from the gist of the present disclosure.

Figure 9:
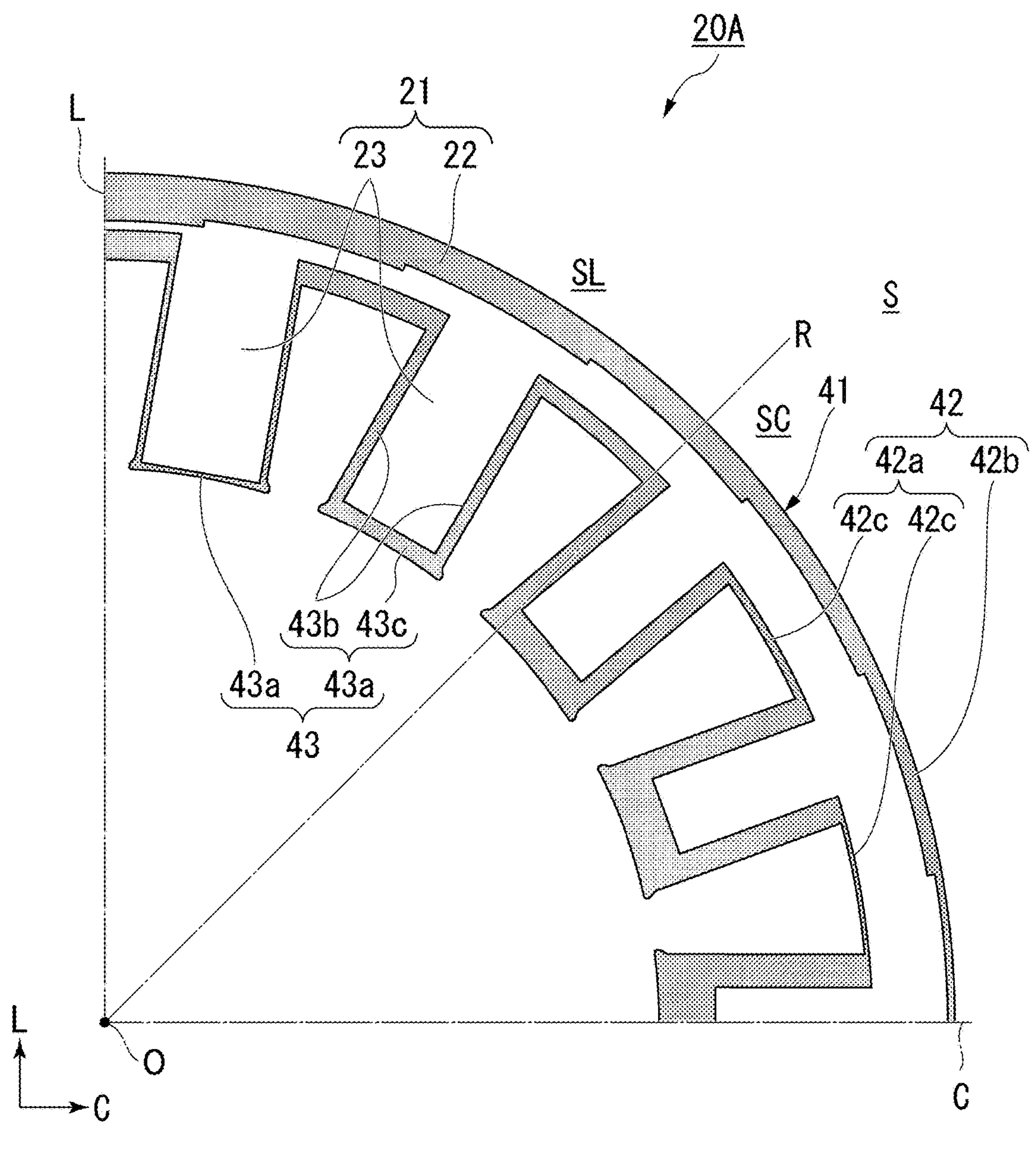
FIG. 9 is a plan view according to a first modification example of the stator included in the rotating electrical machine illustrated in FIG. 1, and is a view corresponding to the enlarged view illustrated in FIG. 5.
Figure 10:
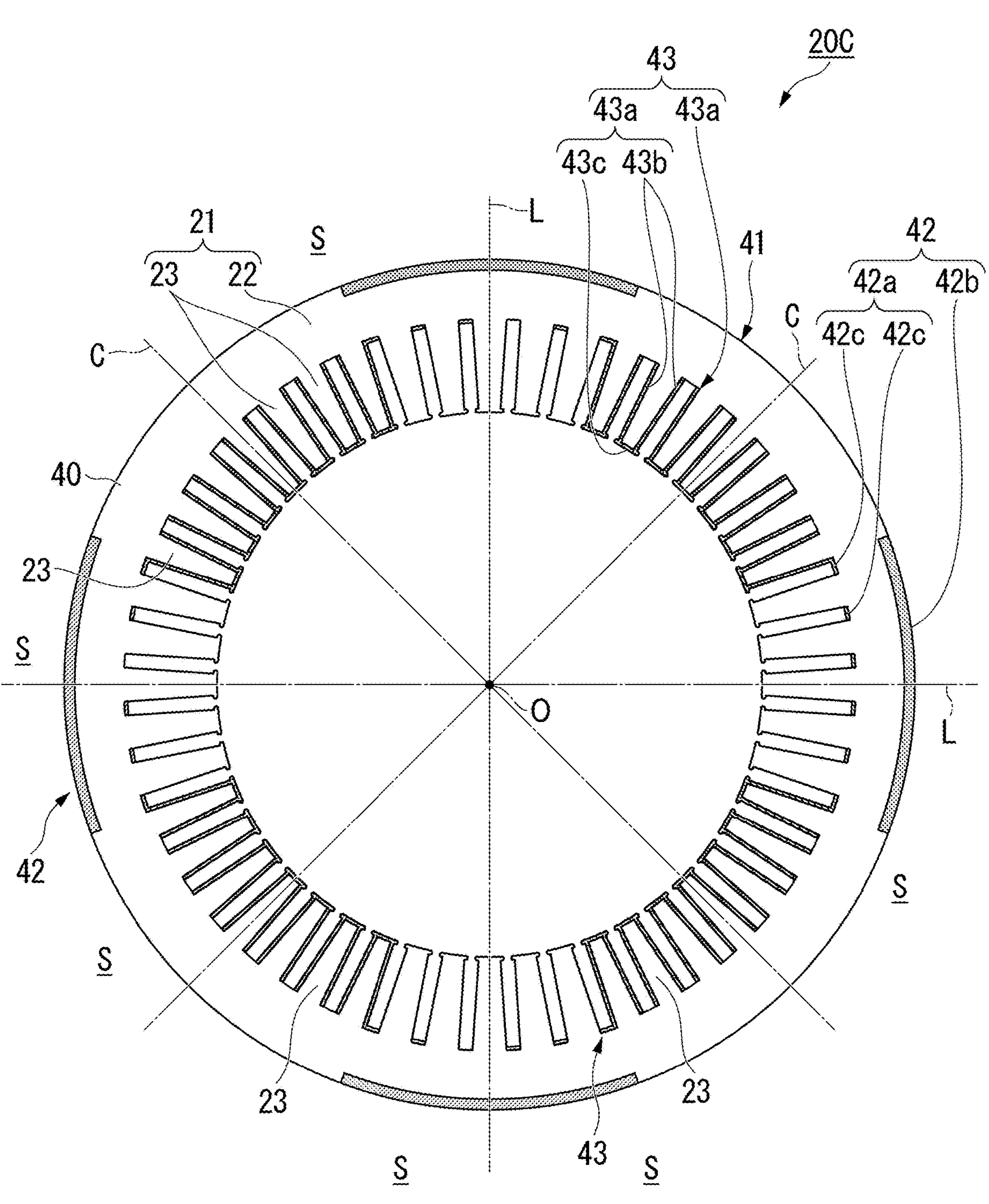
FIG. 10 is a plan view according to a second modification example of the stator included in the rotating electrical machine illustrated in FIG. 1, and is a view corresponding to the enlarged view illustrated in FIG. 4.
Figure 11:
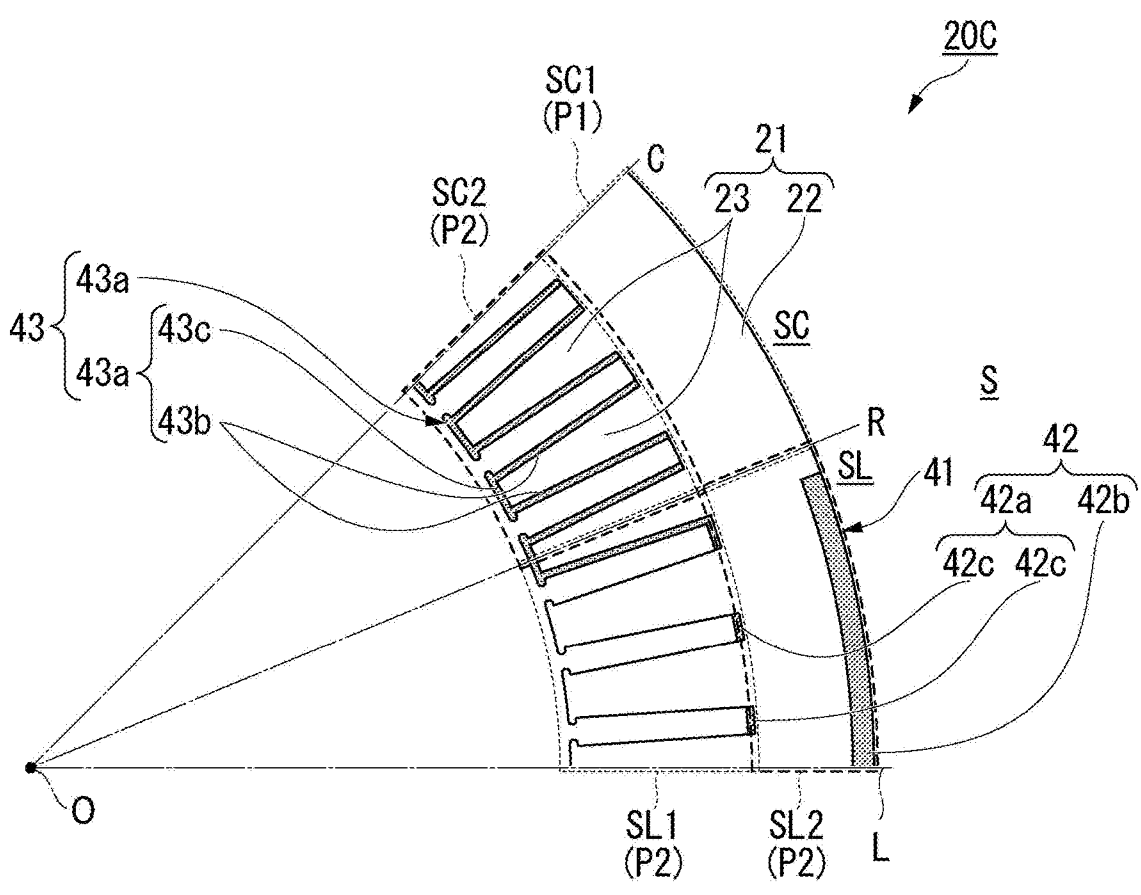
FIG. 11 is a plan view according to the second modification example of the stator included in the rotating electrical machine illustrated in FIG. 1, and is a view corresponding to the enlarged view illustrated in FIG. 5.

For example, as in a stator 20A according to a first modification example illustrated in FIG. 9, the width of the first adhesive portion 42 may decrease from the L-axis toward the C-axis along the circumferential direction. The width of the second adhesive portion 43 may be larger for the tooth 23 located closer to the C-axis side than for the tooth 23 located closer to the L-axis side along the circumferential direction. Here, in the first modification example illustrated in FIG. 9, the width of the first adhesive portion 42 gradually decreases from the L-axis toward the C-axis along the circumferential direction. Note that the width of the first adhesive portion 42 may continuously decrease from the L-axis toward the C-axis along the circumferential direction. Similarly, the width of the second adhesive portion 43 may continuously decrease.

Note that in the enlarged view illustrated in FIG. 9, the positions of the L-axis and the C-axis are interchanged with respect to the enlarged view illustrated in FIG. 5. Here, in the stator 20 according to the embodiment illustrated in FIG. 5, as described above, the width of the first adhesive portion 42 and the width of the second adhesive portion 43 are constant (equal) regardless of a position in the circumferential direction.

In the embodiment, in all the four sections, the area of the adhesion layer 41 in the C-axis side region SC is different from the area of the adhesion layer 41 in the L-axis side region SL, the area of the first adhesive portion 42 in the C-axis side region SC is smaller than the area of the first adhesive portion 42 in the L-axis side region SL, and the area of the second adhesive portion 43 in the C-axis side region SC is larger than the area of the second adhesive portion 43 in the L-axis side region SL. However, another configuration may be adopted in which at least one of the four sections S is the first section that is a section S satisfying the above condition. For example, only one of the four sections S may be the first section, and the remaining three sections S may be sections S not satisfying the above condition.

In the embodiment, the plane view shapes of all the adhesion layers 41 are the same in plan view, but the plane view shapes of all the adhesion layers 41 do not have to be the same.

In the embodiment, each of the adhesion layers 41 has the first section, but it is possible to appropriately change this form to another form including at least one first adhesion layer which is the adhesion layer 41 having the first section.

The adhesion layer 41 does not have to include both the first adhesive portion 42 and the second adhesive portion 43. For example, the adhesion layer 41 may include only one of the first adhesive portion 42 and the second adhesive portion 43.

The C-axis side region SC and the L-axis side region SL are not limited to the forms described in the embodiment. In each section S, it is possible to appropriately change the form to another form in which a region relatively close to the C-axis is set as the C-axis side region SC, and a region having the same area as the C-axis side region SC and relatively close to the L-axis is set as the L-axis side region SL.

The shape of the stator core 21 is not limited only to the forms described in the embodiment. Specifically, the dimensions of the outer diameter and the inner diameter of the stator core 21, the stacking thickness, the number of slots, a proportion between a dimension in a circumferential direction and a dimension in a radial direction of the tooth 23, a proportion between a dimension of the tooth 23 and a dimension of the core back 22 in the radial direction, and the like can be arbitrarily designed according to desired characteristics of the rotating electrical machine.

In the rotor 30 in the embodiment, the pair of permanent magnets 32 forms one magnetic pole, but the present disclosure is not limited thereto. For example, one permanent magnet 32 may form one magnetic pole, or three or more permanent magnets 32 may form one magnetic pole.

In the embodiment, the permanent magnet field type electric motor has been described as an example of the rotating electrical machine, but the structure of the rotating electrical machine is not limited thereto as exemplified below, and furthermore, various known structures not exemplified below can also be adopted.

In the embodiment, the permanent magnet field type electric motor has been described as an example of the synchronous electric motor, but the present disclosure is not limited thereto. For example, the rotating electrical machine may be a reluctance type electric motor or an electromagnetic field type electric motor (winding field type electric motor).

In the embodiment, the synchronous motor has been described as an example of the AC electric motor, but the present disclosure is not limited thereto. For example, the rotating electrical machine may be an induction electric motor.

In the embodiment, the AC electric motor has been described as an example of the electric motor, but the present disclosure is not limited thereto. For example, the rotating electrical machine may be a DC electric motor.

In the embodiment, the electric motor has been described as an example of the rotating electrical machine, but the present disclosure is not limited thereto. For example, the rotating electrical machine may be a generator.

In the above embodiment, the case where the stacked core according to the present disclosure is applied to a stator core has been exemplified, but the stacked core can also be applied to a rotor core.

Note that the direction (L direction) in which the L-axis extends is an easy-magnetization direction as described above. Here, a relationship between the easy-magnetization direction and a rolling direction is appropriately set according to, for example, the type of electrical steel sheet. For example, the easy-magnetization direction may coincide with the rolling direction, or does not have to coincide therewith. In a case where a magnetic flux is generated in the direction in which the L-axis extends (easy-magnetization direction), the amount of an increase in iron loss is smaller than that in a case where the magnetic flux is generated in the direction in which the C-axis extends. Note that in a case where an elastic compressive stress is applied in the direction in which the L-axis extends, the amount of an increase in iron loss is larger than that in a case where the elastic compressive stress is applied in the direction in which the C-axis extends. In addition, in a case where plastic strain is applied in the direction in which the L-axis extends, the amount of an increase in iron loss is larger than that in a case where plastic strain is applied in the direction in which the C-axis extends.

In the present embodiment, the electrical steel sheet 40 is partitioned into four sections S, but the present disclosure is not limited thereto. For example, as in a stator 20C according to a second modification example illustrated in FIGS. 10 and 11, the electrical steel sheet 40 can be partitioned into eight sections S. In the stator 20C according to the second modification example, two or more easy-magnetization directions exist in one electrical steel sheet 40. The two easy-magnetization directions are orthogonal to each other. In such an electrical steel sheet 40, the L-axes extend in the two easy-magnetization directions, respectively, and are orthogonal to each other on the central axis O. The L-axes (easy-magnetization directions) are disposed at equal intervals of 90 degrees around the central axis O. The C-axis extends in a direction (45-degree direction) in which a central angle (90 degrees) formed around the central axis O by the L axes adjacent to each other in the circumferential direction is divided into two equal parts. Note that in the present modification example, the L-axis (easy-magnetization direction) does not have to coincide with the rolling direction. The direction in which the L-axis (easy-magnetization direction) extends may be a 45° direction or a 135° direction with respect to the rolling direction. The direction in which the C-axis extends may coincide with the rolling direction, or may coincide with a direction perpendicular to the rolling direction.

Note that whether there are two easy-magnetization directions in one electrical steel sheet 40 can be determined, for example, as follows. That is, for example, a square or rectangular measurement sample is cut out from the electrical steel sheet 40 to have a plurality of angles with respect to the rolling direction according to the above-described determination direction of the easy-magnetization direction. By magnetically measuring the cut sample by the above-described method for magnetically measuring an electrical steel strip with a single sheet tester, it is possible to confirm existence of the easy-magnetization direction.

In the above embodiment, the stator cores 21 is not obtained by rotational stacking, but may be obtained by rotational stacking. Whether or not the stator cores 21 is obtained by rotational stacking can be determined, for example, by confirming an external appearance of the stator cores 21.

Figure 12:
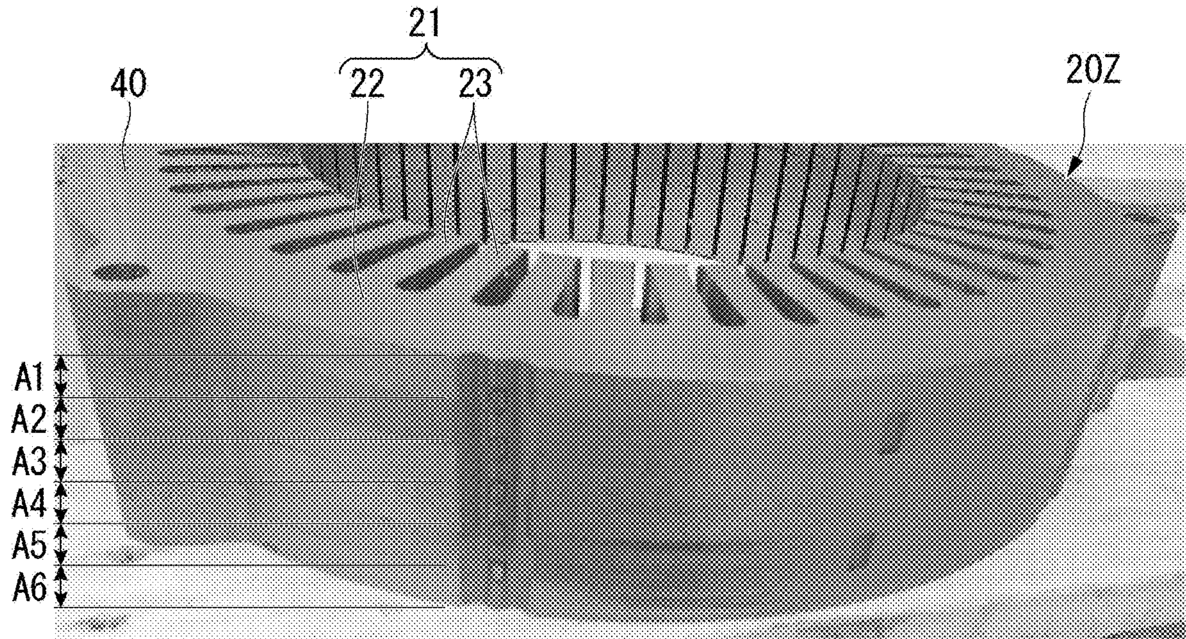
FIG. 12 is a photograph for explaining rotational stacking, and is a photograph indicating a general stacked core.

FIG. 12 is a photograph for explaining determination of rotational stacking. This photograph indicates a general stator 20Z. In the stator 20Z, the electrical steel sheets 40 are rotationally stacked every predetermined number of the electrical steel sheets 40. In the stator 20Z, the stator 20Z includes six stacked bodies A1 to A6 including a first stacked body A1 to a sixth stacked body A6. In each of the stacked bodies A1 to A6, the electrical steel sheets 40 are stacked. The stator 20Z is formed by stacking the six stacked bodies A1 to A6.

The orientations of the electrical steel sheets 40 forming each of the stacked bodies A1 to A6 are common. Therefore, in the electrical steel sheets 40 forming each of the stacked bodies A1 to A6, the L-axis and the C-axis overlap with each other in plan view. As a result, the adhesion layer 41 disposed inside each of the stacked bodies A1 to A6 functions as a first adhesion layer for both of the two electrical steel sheets 40 to which the adhesion layer 41 is bonded, and satisfies, for example, the above-described relationship of the adhesive area ratio in the present disclosure.

On the other hand, the orientations of the electrical steel sheets 40 are different between the stacked bodies A1 to A6 adjacent to each other in the stacking direction. Therefore, in the electrical steel sheets 40 forming the stacked bodies A1 to A6 adjacent to each other in the stacking direction, the L-axis and the C-axis do not overlap with each other in plan view in some cases. As a result, the adhesion layer 41 located at a boundary of any adjacent two of the stacked bodies A1 to A6 functions as the first adhesion layer only for the electrical steel sheet 40 of one of the adjacent two of the stacked bodies A1 to A6, and for example, the above-described relationship of the adhesive area ratio in the present disclosure may be satisfied.

As illustrated in FIG. 12, gloss of an outer circumferential surface of each of the stacked bodies A1 to A6 changes at a boundary of adjacent two of the stacked bodies A1 to A6 to such an extent that it can be visually recognized by a person. Therefore, it is possible to determine whether the stator 20Z includes the stacked bodies A1 to A6 (that is, whether or not the electrical steel sheets are rotationally stacked) by visually recognizing the outer circumferential surface of the stator 20Z.

In addition, it is possible to appropriately replace the constituent elements in the embodiment with well-known constituent elements without departing from the gist of the present disclosure, and the above-described modification examples may be appropriately combined with each other.

Next, a verification test for verifying the above-described effects was performed.

(First Verification Test)

In this verification test, a plurality of test pieces were prepared. Each of the test pieces is a non-oriented electrical steel sheet made of the same material. Each of the test pieces has a square shape with a side of 100 mm. In the square shape formed by the test piece, a first side is parallel to the L direction which is the easy-magnetization direction (rolling direction), and a second side is parallel to the C direction which is a direction orthogonal to the rolling direction.

An adhesive was intermittently applied in dots to an entire surface of each of these test pieces. The plurality of dots of the adhesive had an equal shape and an equal size, and were disposed at the same intervals. In addition, the size of the dots of the adhesive and the interval between the dots of the adhesive were made different, and an occupied area fraction (that is, an adhesive area ratio) of the adhesive on a surface of the test piece was made different among the plurality of test pieces.

Furthermore, a test piece to which the adhesive was not applied was also prepared. This test piece is a test piece serving as a reference of iron loss.

In each of the plurality of test pieces, (1) iron loss when the magnetic flux was in the L direction and (2) iron loss when the magnetic flux was in the C direction were measured.

Figure 13:
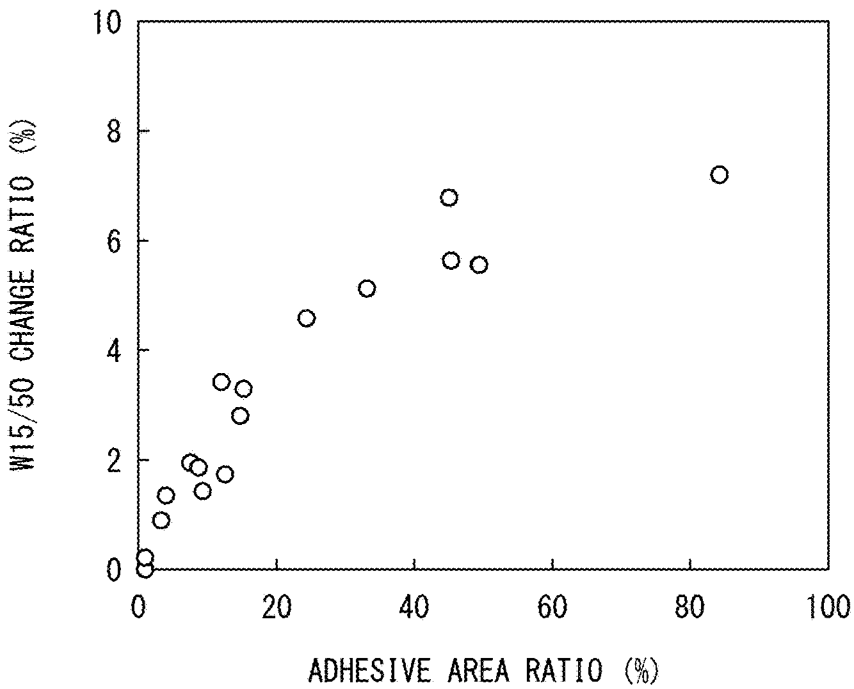
FIG. 13 is a graph illustrating a relationship between an adhesive area ratio and iron loss when a magnetic flux is generated in an L direction in a first verification test.
Figure 14:
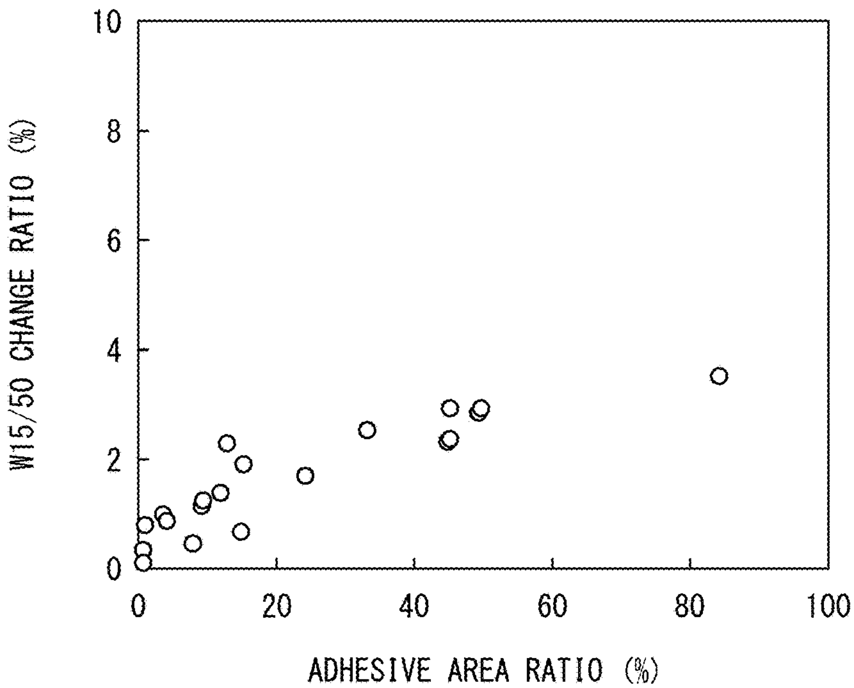
FIG. 14 is a graph illustrating a relationship between an adhesive area ratio and iron loss when a magnetic flux is generated in a C direction in the first verification test.
Figure 15:
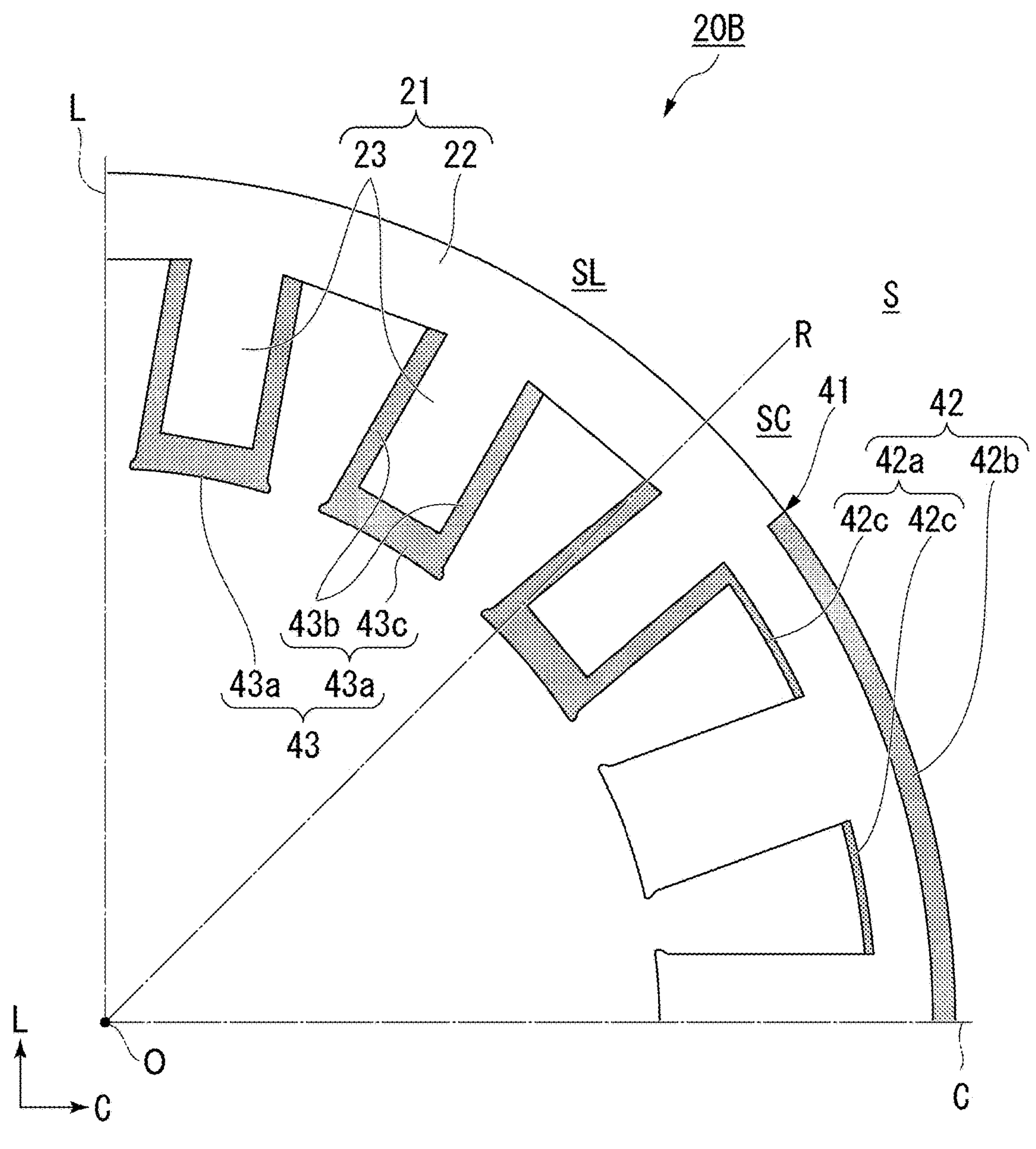
FIG. 15 is a plan view of an electrical steel sheet of a stator as a simulation target of iron loss in a second verification test, and is a view corresponding to the enlarged view illustrated in FIG. 5.

FIGS. 13 and 14 illustrate graphs illustrating a relationship between the adhesive area ratio and the iron loss in (1) and (2), respectively. In these graphs, the horizontal axis represents the adhesive area ratio (%), and the vertical axis represents a W15/50 change ratio (%). The higher a value on the vertical axis, the larger the iron loss. Note that the W15/50 is iron loss when an absolute maximum value of a magnetic flux density is 1.5 T and a fluctuating magnetic flux alternating at 50 Hz is generated.

From these graphs, it was confirmed that in the case (2) where the magnetic flux was in the C direction (FIG. 14), the iron loss was suppressed to be lower (to about a half) particularly as the adhesive area ratio was higher as compared with the case (1) where the magnetic flux was in the L direction (FIG. 13).

(Second Verification Test)

This verification test was performed by simulation using software. As software, finite element method electromagnetic field analysis software JMAG manufactured by JSOL Corporation was used.

In this verification test, the premise was set as follows.

12 poles, 18 slots, concentrated winding, IPM motor

Stator core outer diameter: φ 260 mm, Rotor core outer diameter: φ 164 mm

Testing material: 35A300

Rotation speed and torque: 1000 rpm and 28.9 Nm/m

Under the above premise, one stator core was designed as each of Example and Comparative Example. In the stator core of Example, the plane view shape of the adhesion layer is the shape illustrated in FIGS. 4 and 5. On the other hand, in the stator core of Comparative Example, the plane view shape of the adhesion layer is a shape in which the positions of the L-axis and the C-axis are interchanged with respect to the plane view shape illustrated in FIGS. 4 and 5. That is, as in the stator 20B illustrated in FIG. 15, the plane view shape of the adhesion layer 41 is interchanged between the C-axis side region SC and the L-axis side region SL in each of the above-described four sections S.

Figure 16:
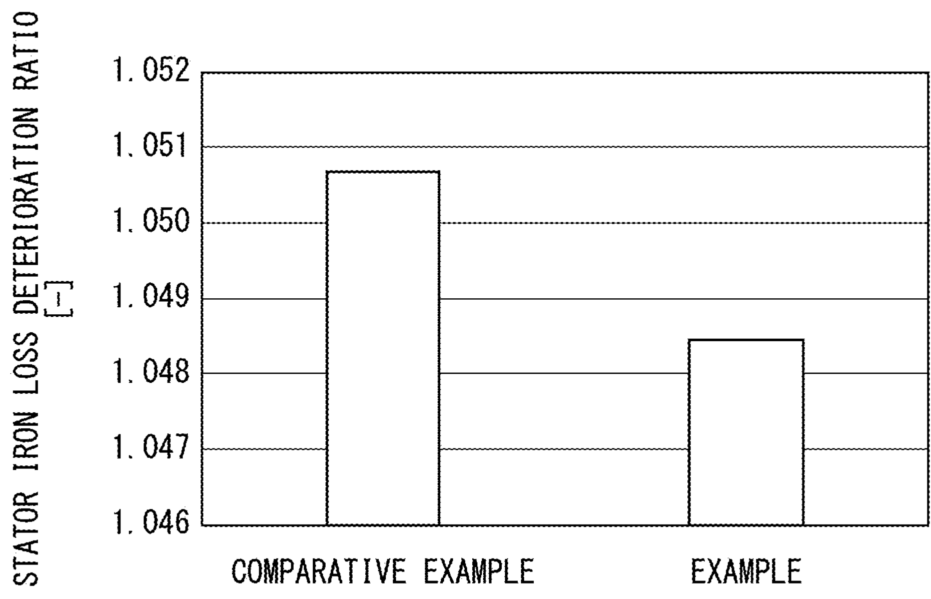
FIG. 16 is a graph illustrating a result of the second verification test.

Simulation was performed on iron loss in the Example and Comparative Example. The results are illustrated in FIG. 16. In FIG. 16, the vertical axis represents a stator iron loss deterioration ratio. A deterioration ratio 1 indicates a case where there is no adhesion layer, and it is indicated that the iron loss increases as a value of the deterioration ratio increases.

From the above graph, it was confirmed that the iron loss in Example was suppressed more than the iron loss in Comparative Example.

In addition, it is possible to appropriately replace the constituent elements in the embodiment with well-known constituent elements without departing from the gist of the present disclosure, and the above-described modification examples may be appropriately combined with each other.

BRIEF DESCRIPTION OF THE REFERENCE SYMBOLS

10 Rotating electrical machine
23 Tooth
40 Electrical steel sheet
41 Adhesion layer
42 First adhesive portion
43 Second adhesive portion
P1 First portion
P2 Second portion
R Reference axis
S Section
SC C-axis side region
SL L-axis side region

The invention claimed is:

1. A stacked core comprising:

a plurality of stacked electrical steel sheets; and a plurality of adhesion layers disposed between the electrical steel sheets adjacent to each other in a stacking direction, wherein the electrical steel sheet includes an annular body, at least one adhesion layer of the plurality of adhesion layers is a first adhesion layer, in one electrical steel sheet of the two electrical steel sheets sandwiching the first adhesion layer in the stacking direction, when an imaginary axis intersecting with a central axis of the annular body and extending in an easy-magnetization direction is defined as an L-axis, an imaginary axis intersecting with the central axis and intersecting with the L-axis is defined as a C-axis, and the electrical steel sheet is partitioned into a plurality of sections in a circumferential direction of the annular body by the L-axis and the C-axis, at least one section of the plurality of sections is a first section, in the first section, an area of the first adhesion layer in a first portion of the electrical steel sheet where a main magnetic flux is generated in the L-axis direction is smaller than an area of the first adhesion layer in a second portion of the electrical steel sheet where a main magnetic flux is generated in the C-axis direction, and the area of the first adhesion layer is greater than 0, wherein in the first section, when a region relatively close to the C-axis is referred to as a C-axis side region and a region relatively close to the L-axis is referred to as an L-axis side region, the first portion includes a portion located in the C-axis side region of the annular body, and the second portion includes a portion located in the L-axis side region of the annular body, and wherein the first adhesion layer includes a first adhesive portion disposed on at least one of an inner peripheral edge and an outer peripheral edge of the annular body, and in the first section, an area of the first adhesive portion in the C-axis side region is smaller than an area of the first adhesive portion in the L-axis side region.

2. The stacked core according to claim 1, wherein the first adhesive portion extends in a belt shape along at least one of an inner peripheral edge and an outer peripheral edge of the annular body, and in the first section, a width of the first adhesive portion is equal regardless of a position in the circumferential direction, or decreases from the L-axis toward the C-axis along the circumferential direction.

3. The stacked core according to claim 2, wherein in the first section, a width of the first adhesive portion decreases from the L-axis toward the C-axis along the circumferential direction.

4. The stacked core according to claim 1, wherein in the first section, when an imaginary axis extending in a direction dividing a central angle formed by the C-axis and the L-axis around the central axis into two equal parts is defined as a reference axis, the C-axis side region and the L-axis side region have a symmetrical relationship in the circumferential direction with respect to the reference axis.

5. The stacked core according to claim 1, wherein all of the plurality of adhesion layers are the first adhesion layers.

6. The stacked core according to claim 1, wherein all of the plurality of sections are the first sections.

7. The stacked core according to claim 1, wherein the electrical steel sheet is a non-oriented electrical steel sheet.

8. The stacked core according to claim 1, wherein the electrical steel sheet is a grain-oriented electrical steel sheet.

9. The stacked core according to claim 1, wherein
the two or more easy-magnetization directions exist in the one electrical steel sheet,
the L-axis each extends in the two or more easy-magnetization directions to intersect with each other on the central axis, and
the C-axis extends in a direction in which a central angle formed around the central axis by the L-axes adjacent to each other in the circumferential direction is divided into two equal parts.

10. A rotating electrical machine comprising the stacked core according to claim 1.

11. A stacked core comprising:
a plurality of stacked electrical steel sheets; and
a plurality of adhesion layers disposed between the electrical steel sheets adjacent to each other in a stacking direction, wherein
the electrical steel sheet includes an annular body,
at least one adhesion layer of the plurality of adhesion layers is a first adhesion layer,
in one electrical steel sheet of the two electrical steel sheets sandwiching the first adhesion layer in the stacking direction, when an imaginary axis intersecting with a central axis of the annular body and extending in an easy-magnetization direction is defined as an L-axis, an imaginary axis intersecting with the central axis and intersecting with the L-axis is defined as a C-axis, and the electrical steel sheet is partitioned into a plurality of sections in a circumferential direction of the annular body by the L-axis and the C-axis,
at least one section of the plurality of sections is a first section,
in the first section, an area of the first adhesion layer in a first portion of the electrical steel sheet where a main magnetic flux is generated in the L-axis direction is smaller than an area of the first adhesion layer in a second portion of the electrical steel sheet where a main magnetic flux is generated in the C-axis direction, and
the area of the first adhesion layer is greater than 0,
wherein
in the first section, when a region relatively close to the C-axis is referred to as a C-axis side region and a region relatively close to the L-axis is referred to as an L-axis side region,
the first portion includes a portion located in the C-axis side region of the annular body, and
the second portion includes a portion located in the L-axis side region of the annular body,
wherein
the electrical steel sheet further includes a plurality of teeth protruding from the annular body inward in a radial direction of the annular body and disposed at intervals in a circumferential direction of the annular body,
the first portion includes a portion of the teeth located in the L-axis side region, and
the second portion includes a portion of the teeth located in the C-axis side region, and
wherein
the first adhesion layer includes a second adhesive portion disposed on a peripheral edge of the teeth, and
in the first section, an area of the second adhesive portion in the C-axis side region is larger than an area of the second adhesive portion in the L-axis side region.

12. The stacked core according to claim 11, wherein
the second adhesive portion extends in a belt shape along a peripheral edge of the teeth, and
in the first section, a width of the second adhesive portion is equal regardless of positions of the teeth in the circumferential direction, or is larger for the teeth located closer to the C-axis side than for the teeth located closer to the L-axis side along the circumferential direction.

13. The stacked core according to claim 12, wherein
in the first section, a width of the second adhesive portion is larger for the teeth located closer to the C-axis side than for the teeth located closer to the L-axis side along the circumferential direction.

14. A stacked core comprising:
a plurality of stacked electrical steel sheets; and
a plurality of adhesion layers disposed between the electrical steel sheets adjacent to each other in a stacking direction, wherein
the electrical steel sheet includes an annular body,
at least one adhesion layer of the plurality of adhesion layers is a first adhesion layer,
in one electrical steel sheet of the two electrical steel sheets sandwiching the first adhesion layer in the stacking direction, when an imaginary axis intersecting with a central axis of the annular body and extending in an easy-magnetization direction is defined as an L-axis, an imaginary axis intersecting with the central axis and intersecting with the L-axis is defined as a C-axis, and the electrical steel sheet is partitioned into a plurality of sections in a circumferential direction of the annular body by the L-axis and the C-axis,
at least one section of the plurality of sections is a first section,
in the first section, an area of the first adhesion layer in a first portion of the electrical steel sheet where a main magnetic flux is generated in the L-axis direction is smaller than an area of the first adhesion layer in a second portion of the electrical steel sheet where a main magnetic flux is generated in the C-axis direction, and
the area of the first adhesion layer is greater than 0,
wherein
in the first section, when a region relatively close to the C-axis is referred to as a C-axis side region and a region relatively close to the L-axis is referred to as an L-axis side region,
the first portion includes a portion located in the C-axis side region of the annular body, and
the second portion includes a portion located in the L-axis side region of the annular body,
wherein
the first adhesion layer includes a belt-shaped adhesive portion,
in the L-axis side region, a total area of the belt-shaped adhesive portions in which the circumferential direction is a longitudinal direction is larger than a total area of the belt-shaped adhesive portions in which a radial direction of the annular body is a longitudinal direction, and
in the C-axis side region, the total area of the belt-shaped adhesive portions in which the circumferential direction is a longitudinal direction is smaller than the total area of the belt-shaped adhesive portions in which the radial direction is a longitudinal direction.

15. A stacked core comprising:

a plurality of stacked electrical steel sheets; and a plurality of adhesion layers disposed between the electrical steel sheets adjacent to each other in a stacking direction, wherein the electrical steel sheet includes an annular body, at least one adhesion layer of the plurality of adhesion layers is a first adhesion layer, in one electrical steel sheet of the two electrical steel sheets sandwiching the first adhesion layer in the stacking direction, when an imaginary axis intersecting with a central axis of the annular body and extending in an easy-magnetization direction is defined as an L-axis, an imaginary axis intersecting with the central axis and intersecting with the L-axis is defined as a C-axis, and the electrical steel sheet is partitioned into a plurality of sections in a circumferential direction of the annular body by the L-axis and the C-axis, at least one section of the plurality of sections is a first section, in the first section, an area of the first adhesion layer in a first portion of the electrical steel sheet where a main magnetic flux is generated in the L-axis direction is smaller than an area of the first adhesion layer in a second portion of the electrical steel sheet where a main magnetic flux is generated in the C-axis direction, and the area of the first adhesion layer is greater than 0, wherein the only one easy-magnetization direction exists in the one electrical steel sheet, and the L-axis and the C-axis are orthogonal to each other.

* * * * *